(12) United States Patent
Nagai et al.

(10) Patent No.: US 8,491,046 B2
(45) Date of Patent: Jul. 23, 2013

(54) VEHICLE SIDE BODY STRUCTURE

(75) Inventors: Shigeyuki Nagai, Wako (JP); Tomohisa Tanaka, Wako (JP); Yusuke Takayama, Wako (JP); Hitoshi Mizohata, Wako (JP); Yasunori Watanabe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 156 days.

(21) Appl. No.: 13/053,848

(22) Filed: Mar. 22, 2011

(65) Prior Publication Data

US 2011/0233970 A1    Sep. 29, 2011

(30) Foreign Application Priority Data

Mar. 23, 2010 (JP) ................... 2010-066784
Mar. 23, 2010 (JP) ................... 2010-066787
Mar. 23, 2010 (JP) ................... 2010-066799

(51) Int. Cl.
*B62D 25/02*    (2006.01)

(52) U.S. Cl.
USPC ............. 296/193.05; 296/146.6; 296/193.06; 296/203.03

(58) Field of Classification Search
USPC .............. 296/146.6, 181.1, 193.01, 193.04, 296/193.05, 193.06, 203.01, 203.03, 205
See application file for complete search history.

(56) References Cited

U.S. PATENT DOCUMENTS

| | | | |
|---|---|---|---|
| 6,447,052 B2 * | 9/2002 | Saeki | 296/188 |
| 6,623,067 B2 * | 9/2003 | Gabbianelli et al. | 296/205 |
| 7,140,674 B2 * | 11/2006 | Miyoshi et al. | 296/203.03 |
| 8,118,355 B2 * | 2/2012 | Tamura et al. | 296/209 |
| 2004/0201253 A1 * | 10/2004 | Kitagawa et al. | 296/187.03 |
| 2006/0175871 A1 * | 8/2006 | Eipper et al. | 296/193.04 |
| 2007/0120394 A1 * | 5/2007 | Nakamori et al. | 296/146.6 |

FOREIGN PATENT DOCUMENTS

JP    08-243770    9/1996
WO    WO 2008068346 A2 *    6/2008

* cited by examiner

*Primary Examiner* — Glenn Dayoan
*Assistant Examiner* — Jason S Daniels
(74) *Attorney, Agent, or Firm* — Rankin, Hill & Clark LLP

(57) ABSTRACT

A center pillar section formed of a high-tensile steel plate is fixed to a side panel frame section including a roof rail section formed of an ordinary-tensile steel plate. A reinforcing member formed of a high-tensile steel plate is provided inside the roof rail section, and the center pillar section is fixed at its upper end portion to the outer surface of the reinforcing member and at its lower end portion to the side sill section. A door beam provided within a front door overlaps the center pillar section and lower portion of a front pillar section. Front and rear end portions of the door beam are opposed to respective increased-width portions of the front pillar section and center pillar section.

6 Claims, 21 Drawing Sheets

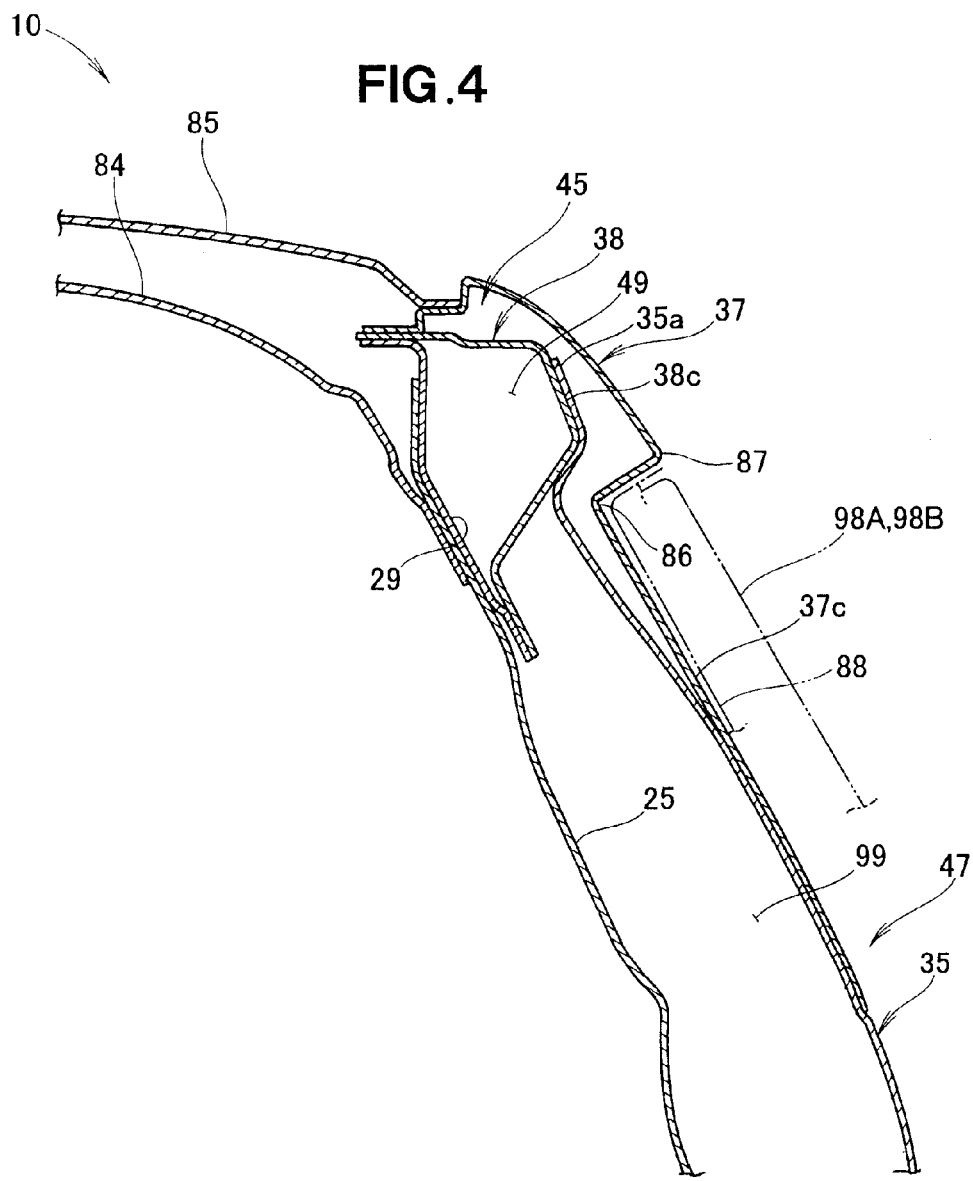

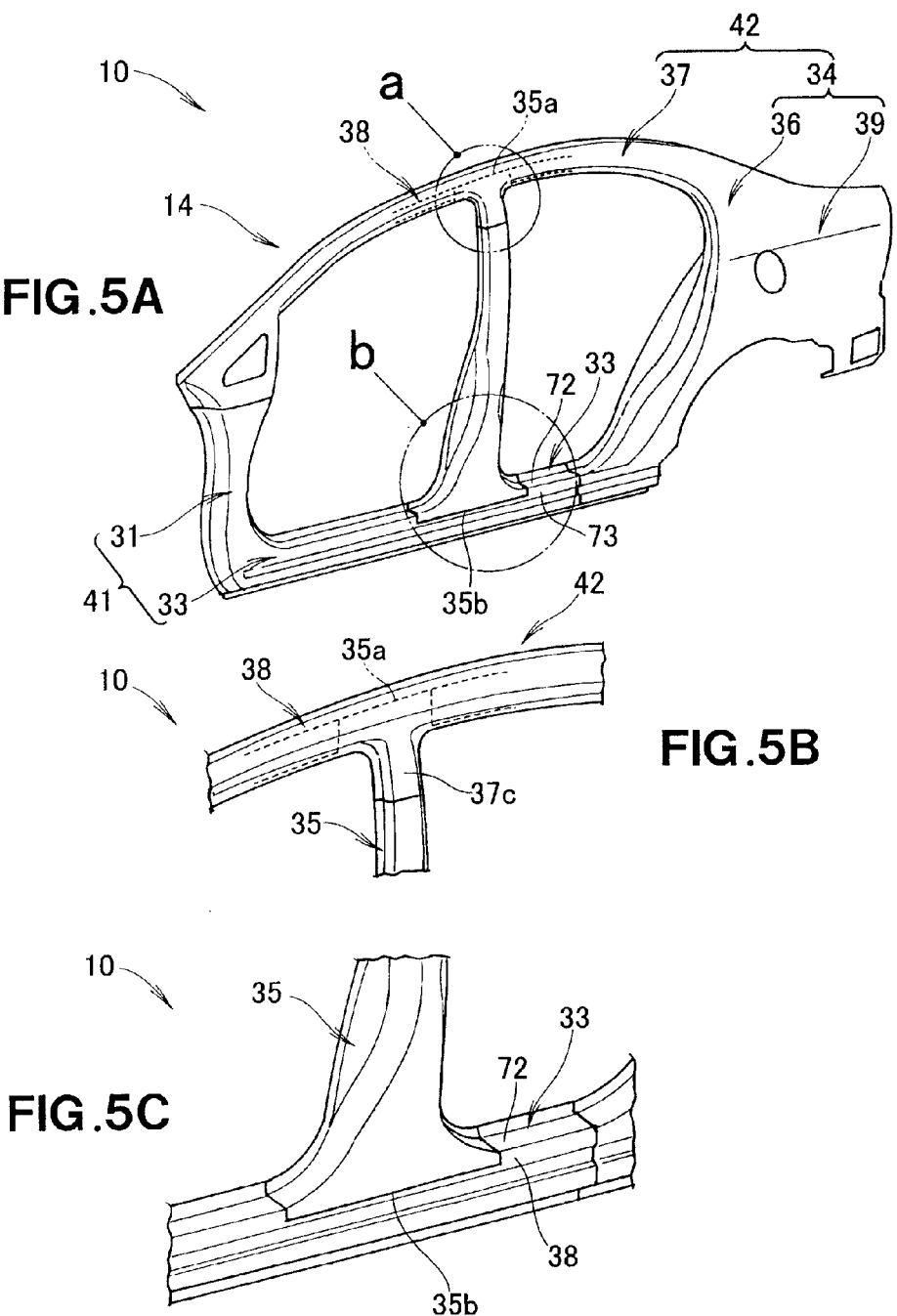

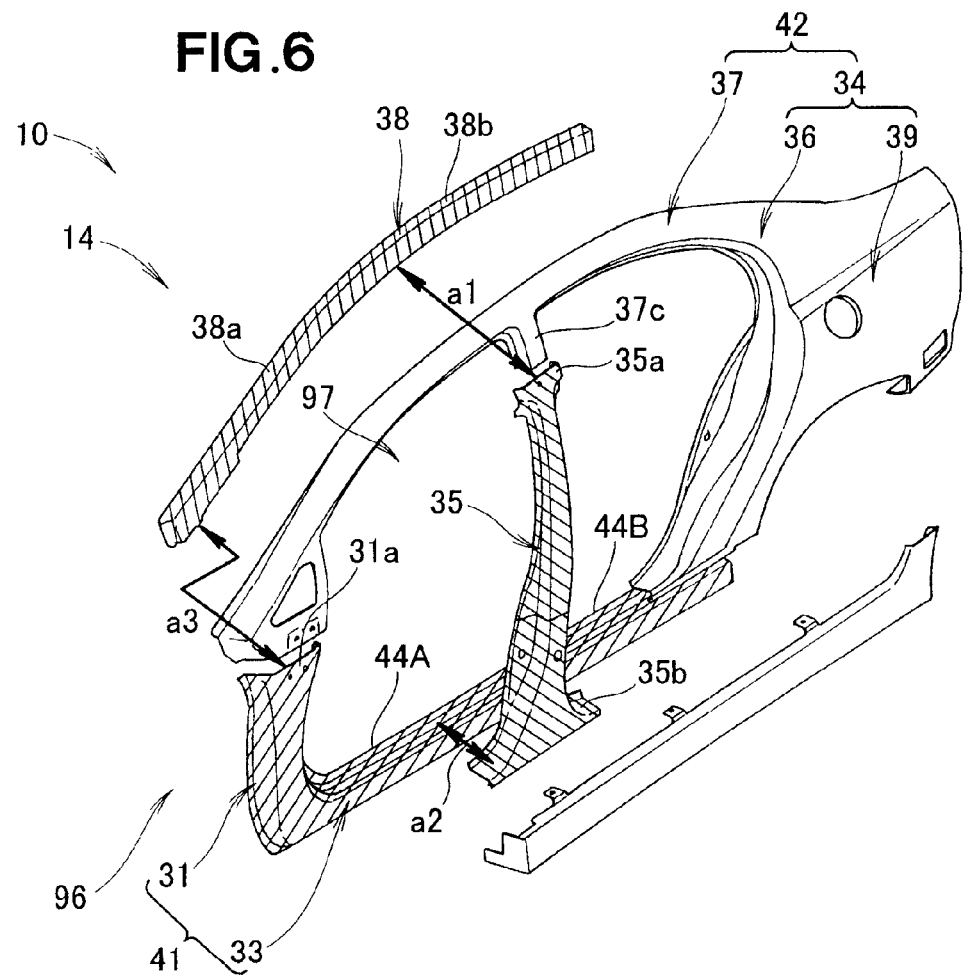

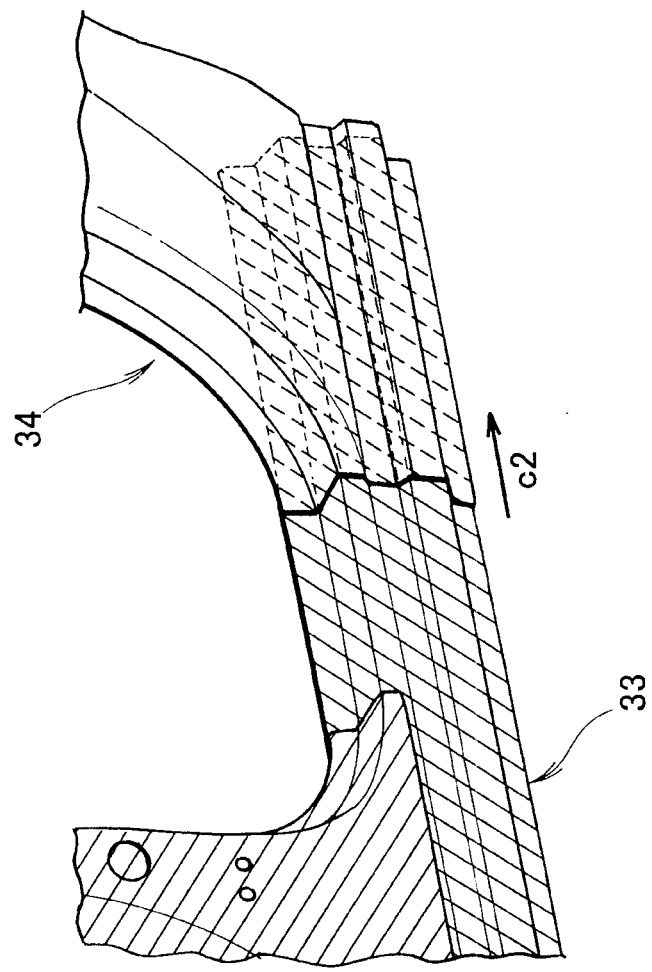
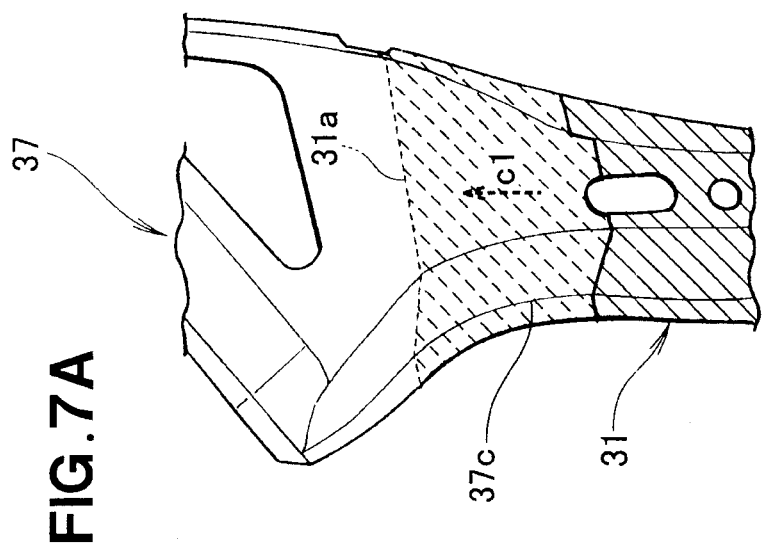
FIG.7A
FIG.7B

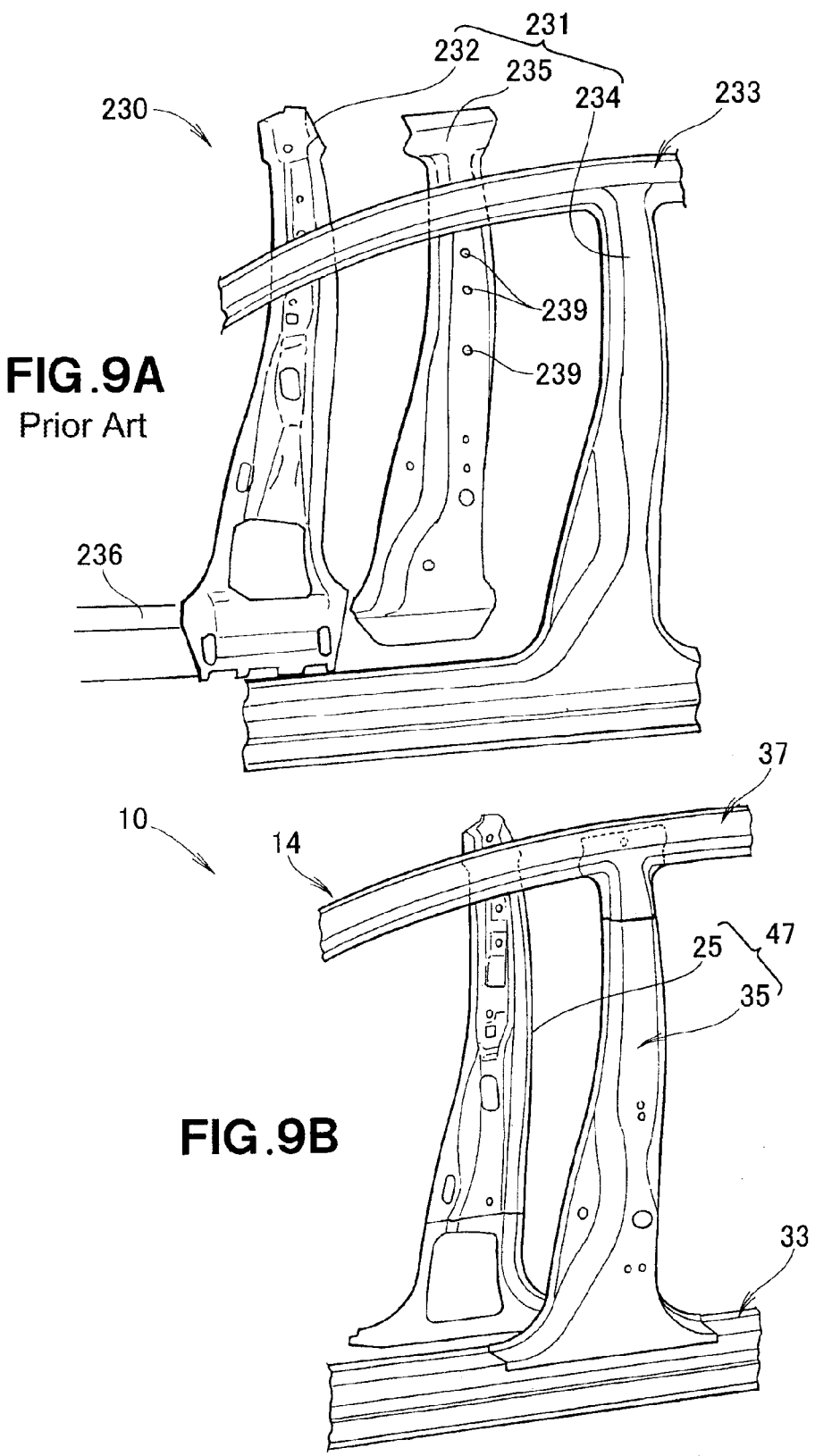

FIG. 10A
Prior Art
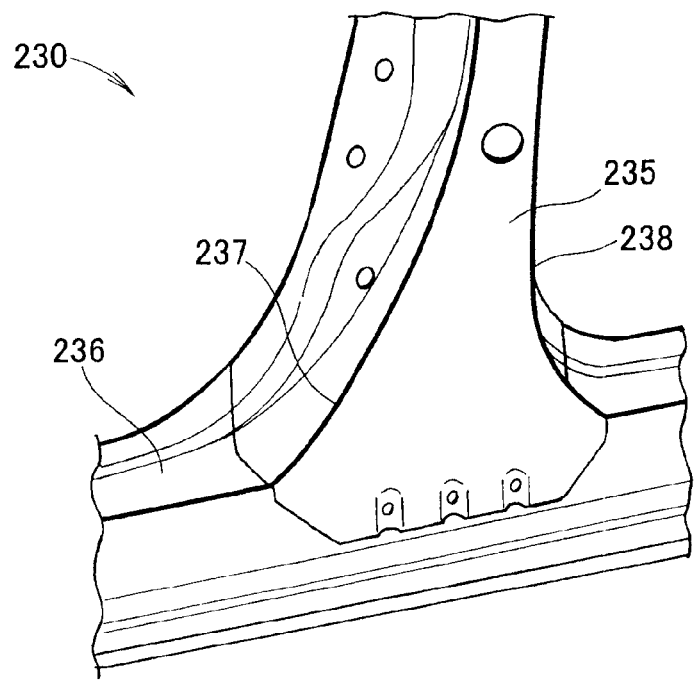
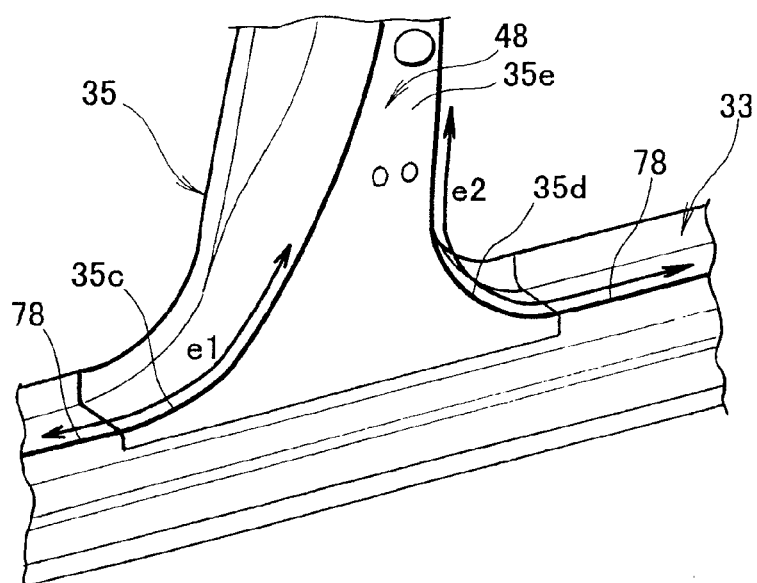
FIG. 10B

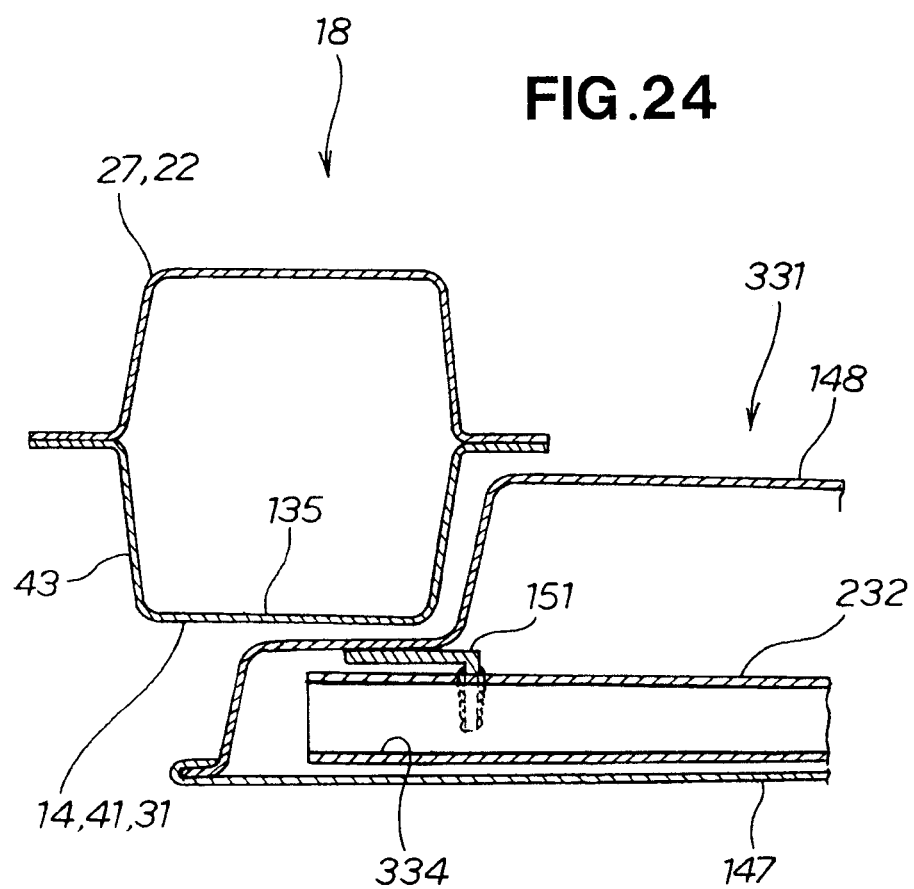

VEHICLE SIDE BODY STRUCTURE

FIELD OF THE INVENTION

The present invention relates generally to vehicle side body structures which includes an outer side panel unit that covers a side of a vehicle body from outside.

BACKGROUND OF THE INVENTION

Generally, in vehicle side body structures, a roof rail section, a slanting front pillar section, a lower front pillar section, a side sill section and a center pillar section are formed of plates (or plate materials), such as cold rolled steel plates, and these plates are sequentially fixedly joined together to construct an outer side panel unit. Namely, first, the roof rail section, slanting front pillar section, lower front pillar section and side sill section are fixedly joined together, and then, the center pillar section is fixedly joined to the thus joined-together roof rail section, slanting front pillar section, lower front pillar section and side sill.

With such vehicle side body structures, where all of the plates except for one plate are first fixedly joined together and then the one plate is fixedly joined to the joined-together plates, dimensional accuracy of the individual plates need not be enhanced more than necessary. One example of such vehicle side body structures is disclosed in Japanese Patent Application Laid-Open Publication No. HEI-8-243770 A (hereinafter referred to as "the relevant patent literature").

According to the disclosure of the relevant patent literature, in manufacturing the outer side panel unit, a plurality of blank plates are sequentially laser-welded to form a frame structure, then a blank plate for forming the center pillar section is spot-welded to the frame structure, and then the structure is pressed to finish an intended product.

In recent years, there has been an increasing need for the outer side panel unit to have an increased strength for sufficiently bearing a lateral collision load and have a reduced weight, and thus, a high-tensile steel plate is used for reinforcing the center pillar section in many cases. However, if such a high-tensile steel plate is used for forming the roof rail section of the outer side panel unit disclosed in the relevant patent literature, small bends cannot be formed by press forming. Thus, the technique disclosed in the relevant patent literature cannot achieve an improved outer appearance by reducing a gap between the roof rail section and a door. Even when a high-tensile steel plate is used for forming the center pillar section, the center pillar section merely overlaps the roof rail section, and thus, a lateral collision cannot be dispersed efficiently.

Further, because the center pillar section needs to have a sufficient strength for bearing a side or lateral collision load, it is desirable that a high-tensile steel plate be used for forming the center pillar section. However, the center pillar section is of a shape requiring deep drawing work, and thus, if a steel plate of a tensile strength equal to or greater than 590 MPa is used for forming the center pillar section, then there may undesirably occur cracks in the center pillar section during press forming.

Further, in the vehicle side body structure disclosed in the relevant patent literature, the frame structure, functioning as frames defining a front door opening of the vehicle, is formed by joining together five plates. Of the outer side panel unit of the vehicle side body structure, a front frame (i.e., outer front pillar section) is formed by fixedly joining two plates. An upper frame (i.e., outer roof rail section) and lower frame (i.e., outer side sill section) are fixedly joined to the front frame. Then, a center frame (outer center pillar section) is joined at its upper end portion to the upper frame in overlapping relation thereto and joined at its lower end portion to the lower frame in overlapping relation thereto. Such arrangements can facilitate the aforementioned joining without requiring dimensional accuracy of the individual plates more than necessary.

However, if a high-tensile steel plate is used for forming the center frame (outer center pillar section), there may undesirably occur cracks in corners of the center frame (outer center pillar section) after plastic forming of the center frame. Further, if a higher-tensile steel plate, such as a steel plate having a tensile strength of 1,000 MPa, is used for the outer center pillar section with a view to achieving a reduced weight and increased strength, greater pressing force would be required for plastic forming, so that a pressing machine of a greater size would be required.

Thus, there has been a demand for a structure which does not require great pressing force, can secure a sufficient strength of the outer center pillar section and can prevent cracks from occurring in the outer center pillar section even if corners of the outer center pillar section are formed in small bending radii.

SUMMARY OF THE INVENTION

In view of the foregoing prior art problems, it is an object of the present invention to provide an improved vehicle side body structure which uses a high-tensile steel plate for forming the outer side panel unit and can thereby reduce the number of inner reinforcements to achieve a reduced weight of the outer side panel unit, and which not only can achieve an improved outer appearance by reducing the gap between the roof rail section and the door but also can sufficiently bear a lateral collision load and efficiently disperse the lateral collision load.

It is another object of the present invention to provide an improved vehicle side body structure which can eliminate a need for a great press forming load, prevent occurrence of a crack etc. in the center pillar section and retain quality stability.

It is still another object of the present invention to provide an improved vehicle side body structure which not only allows the center pillar section of the outer side panel unit to be formed of a high-strength steel plate, but also has a reduced weight and increased strength.

It is still another object of the present invention to provide an improved vehicle side body structure which can secure a sufficient strength of the outer center pillar section and can reduce the bending radius of the outer center pillar section.

In order to accomplish the above-mentioned objects, the present invention provides an improved vehicle side body structure including an outer side panel unit which covers a side of a vehicle body from outside, the outer side panel unit comprising: an outer side panel frame section including a roof rail section formed of an ordinary steel plate and a side sill section; a center pillar section formed of a high-tensile steel plate separately from the outer side panel frame section, the center pillar section being fixedly joined to the outer side panel frame section in such a manner that front and rear door openings are defined in the outer side panel unit; and a reinforcing member disposed inside and along the roof rail section, the center pillar section being fixedly joined at the upper end portion to the outer surface of the reinforcing member and at the lower end portion to the side sill section.

In the present invention, the roof rail section is formed of an easily-press-formable ordinary steel plate and thus can be press formed in desired small bending radii (corner radii). In this manner, the present invention can reduce a gap between the roof rail section and a door, thereby achieving an improved outer appearance. Because the center pillar section of the outer side panel unit is formed of a high-tensile steel plate, the present invention can increase strength for bearing a lateral collision load and disperse the lateral collision load to a transverse roof arch via the reinforcing member located at an upper position of the vehicle side body structure.

Preferably, the roof rail section and a rear panel section of the outer side panel unit together constitute an upper frame section of an ordinary steel plate, and a lower front pillar section and the side sill section of the outer side panel unit together constitute a lower frame section of a high-tensile steel plate. The upper and lower frame sections are fixedly joined to each other at their respective opposite ends, to form the outer side panel frame section. Because a lateral collision load to the center pillar is borne by the outer side panel frame section constructed, as a high-strength frame, of the high-tensile steel plate of the lower frame section and the reinforcing member of the upper frame section, the vehicle side body structure of the present invention can have a high strength and rigidity.

Preferably, the reinforcing member is formed of a high-tensile steel plate and is fixedly joined at its front portion to the upper end of the lower front pillar section formed of a high-tensile steel plate and at its rear portion to an upper end portion of the center pillar section. Thus, a high-strength frame section can be constructed around a front door. In this way, human occupants of the vehicle can be effectively protected from a lateral collision.

Preferably, the reinforcing member defines a closed section in conjunction with an inner roof rail section (of an inner side panel unit disposed inwardly of the outer side panel unit) covered with the roof rail section. Thus, it is possible to increase the strength of the roof rail section and even further increase the strength of the high-strength frame section.

Preferably, the center pillar section is fixedly joined to a transverse roof arch, disposed transversely of the vehicle body, with the closed section sandwiched therebetween. Thus, a lateral collision load having acted on the center pillar section can be dispersed to the transverse roof arch via the closed section.

Preferably, a plurality of the transverse roof arches are arranged side by side in a front-rear direction of the vehicle body and fixed relative to the closed section. Thus, a lateral collision load having acted on the center pillar section can be dispersed to the transverse roof arches via the closed section.

According to another aspect of the present invention, there is provided an improved vehicle side body structure including an outer side panel unit which covers a side of a vehicle body from outside, the outer side panel unit comprising: an outer side panel frame section including a side sill section; a center pillar section formed of a high-tensile steel plate separately from the outer side panel frame section, the center pillar section being fixedly fixed to the outer side panel frame section in such a manner that front and rear door openings are defined in the outer side panel unit and that opposite ridgelines of the center pillar section extend continuously with a ridgeline of the side sill section.

Because the center pillar section is formed of a high-tensile steel plate and the opposite ridgelines of the center pillar section extend continuously with the ridgeline of the side sill section, a lateral collision load input to the door hinge surface of the center pillar section can be effectively dispersed to the side sill section formed of a high-tensile steel plate. Thus, the present invention can dispense with a center pillar stiffener that was required in the conventional counterpart, thereby eliminating a need for a multiplicity of holes that heretofore had to be formed in the center pillar stiffener for discharging an electrodeposition coating material.

Preferably, the center pillar section is formed by hot stamping. With this arrangement, ridgelines of the center pillar section can be formed in desired small bending (or corner) radii, and thus, the present invention can achieve an enhanced rigidity, strength and collision load transmission characteristics.

Preferably, the center pillar section has a door hinge surface extending continuously with the outer surface, in a vehicle width direction, of the side sill section. Thus, the present invention can achieve an enhanced rigidity of the vehicle body, minimizing deformation of the center pillar section.

Preferably, the center pillar section defines, in conjunction with an inner center pillar section of the inner side panel unit disposed inwardly of the outer side panel unit, a closed section having no center pillar stiffener provided therein. Thus, the present invention can dispense with, for example, a center pillar stiffener as required in the conventional counterpart, thereby eliminating a need for a multiplicity of holes that had to be formed in the conventional counterpart for promoting adhesion of an ED coating material, so that the present invention can achieve an enhanced vehicle body performance, collision performance and reduced processing cost.

Preferably, the outer side panel unit further comprises a roof rail section, a rear panel section and a lower front pillar section, the roof rail section and the rear panel section together constitute an upper frame section of an ordinary steel plate while the lower front pillar section and the side sill section together constitute a lower frame section of a high-tensile steel plate, and the upper frame section and the lower frame section are joined to each other at their respective opposite ends to thereby constitute the outer side panel frame section, the center pillar section being provided between the upper frame section and the lower frame section. Using a high-tensile steel plate for forming portions that require a high strength as noted above can dispense with, among others, inner reinforcing members. As a result, it is possible to provide, at low cost, a vehicle body which has an increased rigidity and strength and a reduced weight.

Preferably, the outer side panel unit further comprises a reinforcing member provided inside the roof rail section of the outer side panel frame section, the reinforcing member being formed of a high-tensile steel plate and fixedly joined at its front portion to the upper end of the lower front pillar section, and the center pillar section is fixedly joined at its upper end portion to the outer surface of a rear portion of the reinforcing member and at its lower end portion to the outer surface of the side sill section. Thus, a lateral collision load can be dispersed also via the upper end portion of the center pillar section.

According to still another aspect of the present invention, there is provided an improved vehicle side body structure including a side panel unit of a side body constituting a side wall of a passenger compartment, the side panel unit comprising: a front pillar section constituting a front frame of a front door opening; a center pillar section constituting a rear frame of the front door opening; a roof rail section constituting an upper frame of the front door opening and extending toward a rear of the vehicle; and a side sill section constituting a lower frame of the front door opening, a lower portion of the front pillar section (i.e., lower front pillar section) being formed of a high-tensile steel plate, the center pillar section being formed of a high-tensile steel plate. Further, a door beam is disposed within a front door, provided in the front door opening, overlaps both the center pillar and the lower front pillar section as viewed from a side of the vehicle.

Because the lower front pillar section is formed of a high-tensile steel plate, the center pillar section is formed of a high-tensile steel plate and the door beam disposed within the front door overlaps both the center pillar and the lower front pillar section as viewed from a side of the vehicle, ridgeline portions defining corners of a bottom portion of the center pillar section can be formed in small bending radii, so that the front door and the door beam can be located closer to the front pillar section. Thus, at the time of a lateral collision of the vehicle, the center pillar section can receive a collision impact (load) at an earlier stage. Namely, the present invention can advantageously reduce a time for the collision impact (load) to transmit from the door beam to the center pillar section.

Preferably, the center pillar section is formed by hot stamping. Thus, in the case where the center pillar section is formed in a channel (or) U sectional shape, ridgeline portions defining corners of the bottom portion of the center pillar section can be formed in small bending radii. In this way, an overlap width between the center pillar section and the door beam can be increased, so that more of the lateral collision impact (load) can be transmitted to the center pillar. Namely, the center pillar can receive more of the lateral collision impact (load).

Preferably, the lower front pillar section and the center pillar section have respective increased-width portions, and the door beam is disposed in the front door in such an oblique orientation that its front end portion is opposed to the increased-width portion of the lower front pillar section and its rear end portion is opposed to the increased-width portion of the center pillar section. In this way, the present invention can even further increase overlap widths between the door beam and the lower front pillar section and the center pillar section and can more efficiently disperse a lateral collision impact (load).

Preferably, the center pillar section has a channel sectional shape, and ridgeline portions, defining corners of a bottom portion, of the center pillar section extend continuously with a ridgeline of the side sill section constituting the lower frame of the front door opening. Thus, the present invention can disperse a lateral collision impact (load) continuously from the center pillar section to the lower frame (side sill).

Preferably, the center pillar section is fixedly joined at its upper end portion to a reinforcing member disposed inside the roof rail section. Thus, the present invention can disperse a lateral collision impact (load) continuously from the center pillar section to the roof rail.

Preferably, the front door opening and a rear door opening are defined by the center pillar section being fixedly joined to an outer side panel frame section that comprises an upper frame section and a lower frame section, and the upper frame section comprises a slanting upper portion of the front pillar section, the roof rail section and a rear panel section and is integrally formed of an ordinary steel plate from, while the lower frame section comprises the lower front pillar section, fixedly joined to the upper portion of the front pillar section, and the side sill section constituting the lower frame of the front door opening and is integrally formed of a high-tensile steel plate. A high-strength reinforcing member is disposed inside the roof rail section and integrally extends to the upper end of the lower front pillar section, and the center pillar section is plastically formed of a separate high-tensile steel plate and fixedly jointed at its upper end portion to a rear portion of the reinforcing member and fixedly jointed at its lower end portion to the side sill section. In this way, the side panel unit in the present invention can have a high-strength, front-door-opening defining frame section which includes the high-strength reinforcing member disposed inside the roof rail, the front pillar section and side sill section having a tensile strength of 980 MPa and the center pillar having a tensile strength in the range of 590 MPa to 1,180 MPa. Also, the roof rail section is formed of a steel plate having a tensile strength of about 270 MPa, so that corners of the roof rail section, plastically formed by a press machine, can be formed in small bending radii (corner radii). Thus, the present invention can reduce a gap between the roof rail section and the front door, thereby achieving an improved outer appearance of the vehicle.

With aforementioned arrangements, the present invention not only can dispense with reinforcing members that have to be disposed within a center pillar, side sill and lower front pillar in the conventional counterpart and thereby achieve a reduced weight, but also can increase the strength of the vehicle body.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which:

FIG. 4 is a sectional front view of the vehicle side body structure shown in FIG. 1;

FIG. 5A is a view explanatory of joined portions in the vehicle side body structure shown in FIG. 1;

FIG. 5B is an enlarged view of a section encircled at "a" in FIG. 5A;

FIG. 5C is an enlarged view of a section encircled at "b" in FIG. 5A;

FIG. 6 is a view explanatory of how the vehicle side body structure shown in FIG. 1 is assembled;

FIGS. 7A and 7B are views explanatory of overlapping relationship between the joined portions in the vehicle side body structure shown in FIG. 1;

FIG. 9A is a view showing a comparative conventional example of a vehicle side body structure;

FIG. 9B is a view showing the embodiment of the vehicle side body structure, which is explanatory of differences of the embodiment from the comparative conventional example;

FIG. 10A is a view showing how a lower end portion of a center pillar is joined in the comparative conventional example of the vehicle side body structure;

FIG. 10B is a view showing how a lower end portion of the center pillar is joined in the comparative conventional example of the vehicle side body structure;

FIG. 24 is a sectional view taken along line 24-24 of FIG. 21.

DETAILED DESCRIPTION OF THE PREFERRED EMBODIMENTS

Figure 1:
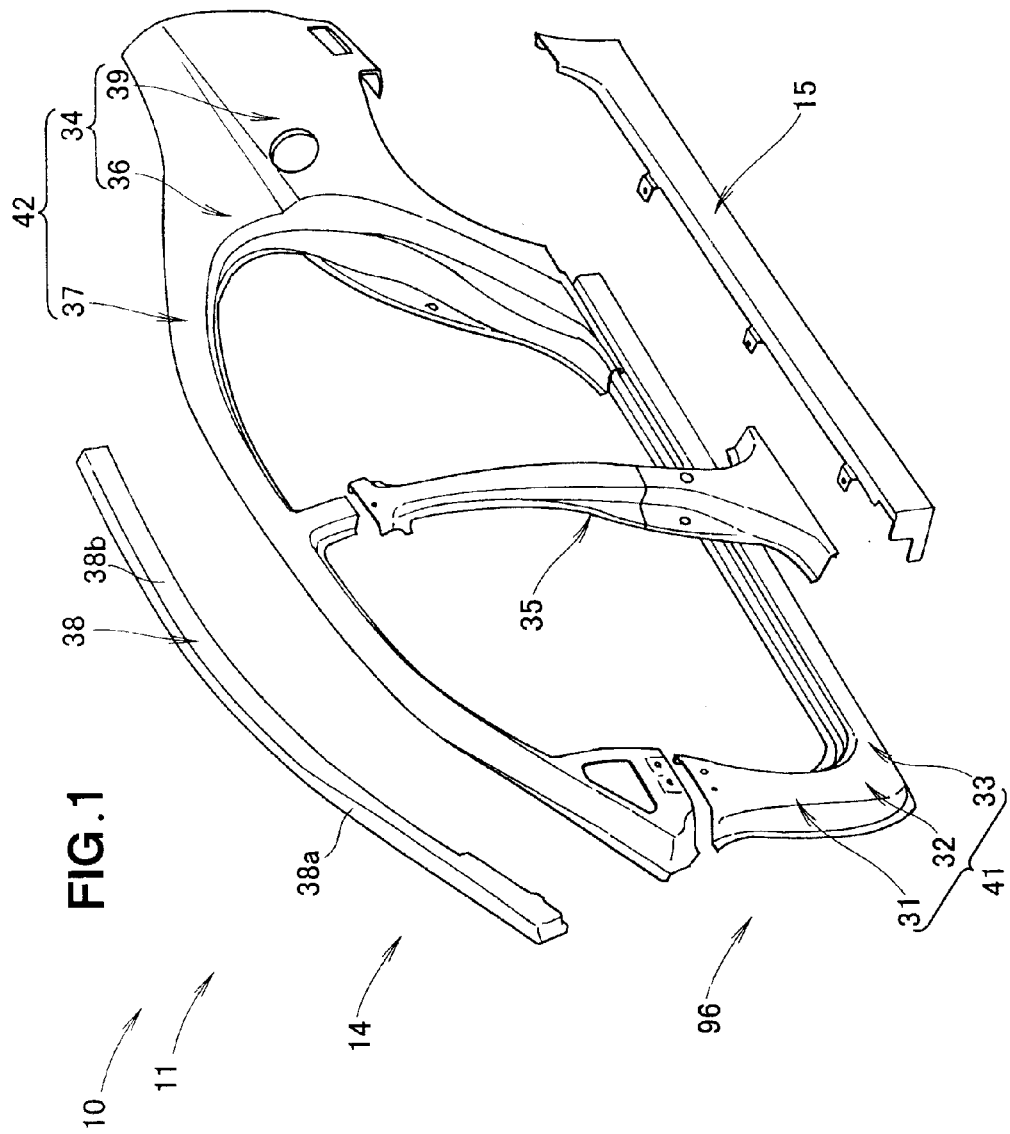
FIG. 1 is an exploded perspective view showing an embodiment of a vehicle side body structure of the present invention.
Figure 2:
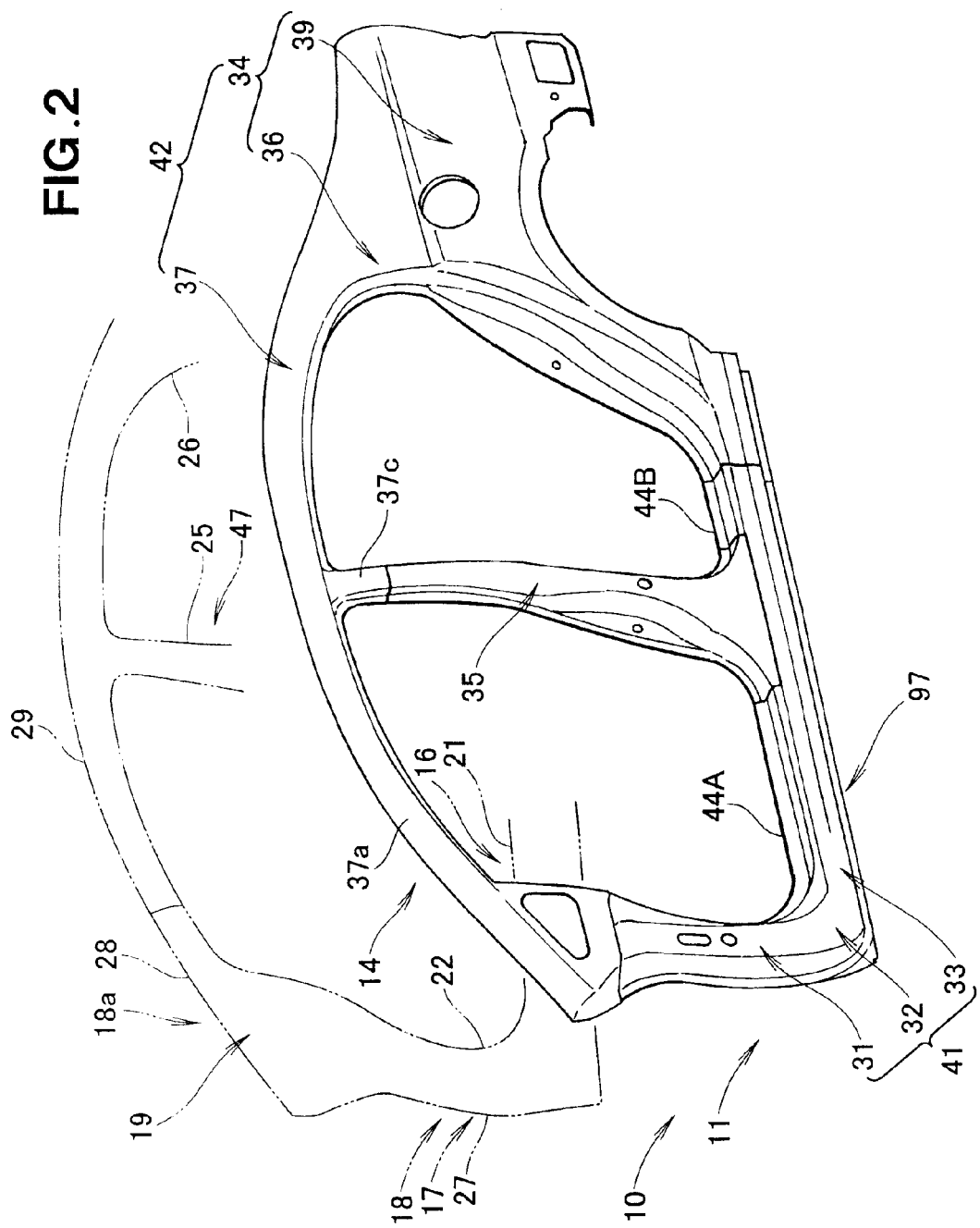
FIG. 2 is a perspective view of an outer side panel unit of the vehicle side body structure shown in FIG. 1.

As shown in FIGS. 1 to 4, an embodiment of a vehicle side body structure 10 of the present invention includes an outer side panel unit 14 to which are fixedly joined various members and which covers a side surface of an inner side panel unit 19 of a vehicle body 11, and a side sill garnish 15 that covers an outer side sill section 33 of the outer side panel unit 14 from outside.

The outer side panel unit 14 is fixedly joined to the inner side panel unit 19 in such a manner as to form a closed section between the outer side panel unit 14 and the inner side panel unit 19. The inner side panel unit 19 includes an inner side sill section 21, an inner front pillar section 27 (including a inner lower front pillar section 22), an inner center pillar section 25 and an inner rear pillar section 26.

The outer side panel unit 14 includes: the outer side sill section 33 that covers the inner side sill section 21 from outside the vehicle body 11; a lower portion 31 of the outer front pillar section (i.e., outer lower front pillar section 31) that covers the inner lower front pillar section 22 from outside the vehicle body 11; an outer center pillar section 35 that covers the inner center pillar section 25 from outside the vehicle body 11; an outer rear pillar section 36 that covers the inner rear pillar section 26 from outside the vehicle body 11: a rear fender panel 39 that is formed behind the outer rear pillar section 36 to cover a rear portion of the vehicle body 11; an outer roof rail section 37 that covers a slanting section 28 of the inner front pillar section 27 and an inner roof rail section 29 from outside the vehicle body 11; and a roof rail stiffener (reinforcing member) 38 that reinforces the roof rail section 37 from inside. The rear pillar section 36 and the fender panel 39 together constitute a rear panel section 34.

The side sill section 33 extends straight in a front-rear direction of the vehicle body. The outer lower front pillar section 31 is raised substantially vertically from the front end of the side sill section 33. The side sill section 33 and the outer lower front pillar section 31 are formed integrally via a bent section 32. Namely, the outer lower front pillar section 31, bent section 32 and side sill section 33 are formed integrally of the same plate, to constitute an L-shaped lower frame section 41.

The center pillar section 35 is an I-shaped member that extends substantially vertically upward from a longitudinally-middle region of the side sill section 33. The roof rail section 37 and the rear panel section 34 (composed of the rear pillar section 36 and fender panel 39) are formed of the same plate and constitute an upper frame (i.e., composite frame) section 42. The roof rail stiffener 38 is formed to extend along the roof rail section 37.

Namely, the outer side panel unit 14 is formed by fixedly joining the center pillar section 35 to the lower frame section 41 and the upper frame section 42 that are formed separately from the center pillar section 35. The lower frame section 41 and the upper frame section 42 (including the stiffener 38) together constitute an outer side panel frame section 96.

A side sill 16, extending along the side sill garnish 15 in the front-rear direction, comprises the outer side sill section 33 of the outer side panel unit 14, and the inner side sill section 21 on which the outer side sill section 33 is lapped to form a closed section between the inner side sill section 21 and the side sill section 33. The side sill 16 further includes the side sill garnish 15 that covers the side sill section 33.

A front pillar 18 includes a lower front pillar 17 extending upward from the side sill 16, and a slanting front pillar section 18a slantingly extending rearward from the lower front pillar 17.

The slanting front pillar section 18a comprises the slanting section 28 of the inner front pillar section 27, and a front half section 37a of the roof rail section 37. The lower front pillar 17 comprises the lower front pillar section 31 of the outer side panel unit 14, and the inner lower front pillar section 22 on which the outer lower front pillar section 31 is lapped to form a closed section between the inner front pillar 22 and the outer lower front pillar section 31.

As shown in FIG. 4, a roof rail 45 comprises the inner roof rail section 29, the outer roof rail section 37 and the roof rail stiffener 38. The roof rail stiffener 38 is provided within the roof rail section 37 so that a closed section (rail-side closed section) 49 is formed between the roof rail stiffener 38 and the inner roof rail section 29. The inner center pillar section 25 is fixedly joined at its upper portion to the inner surface of the inner roof rail section 29.

Figure 3:
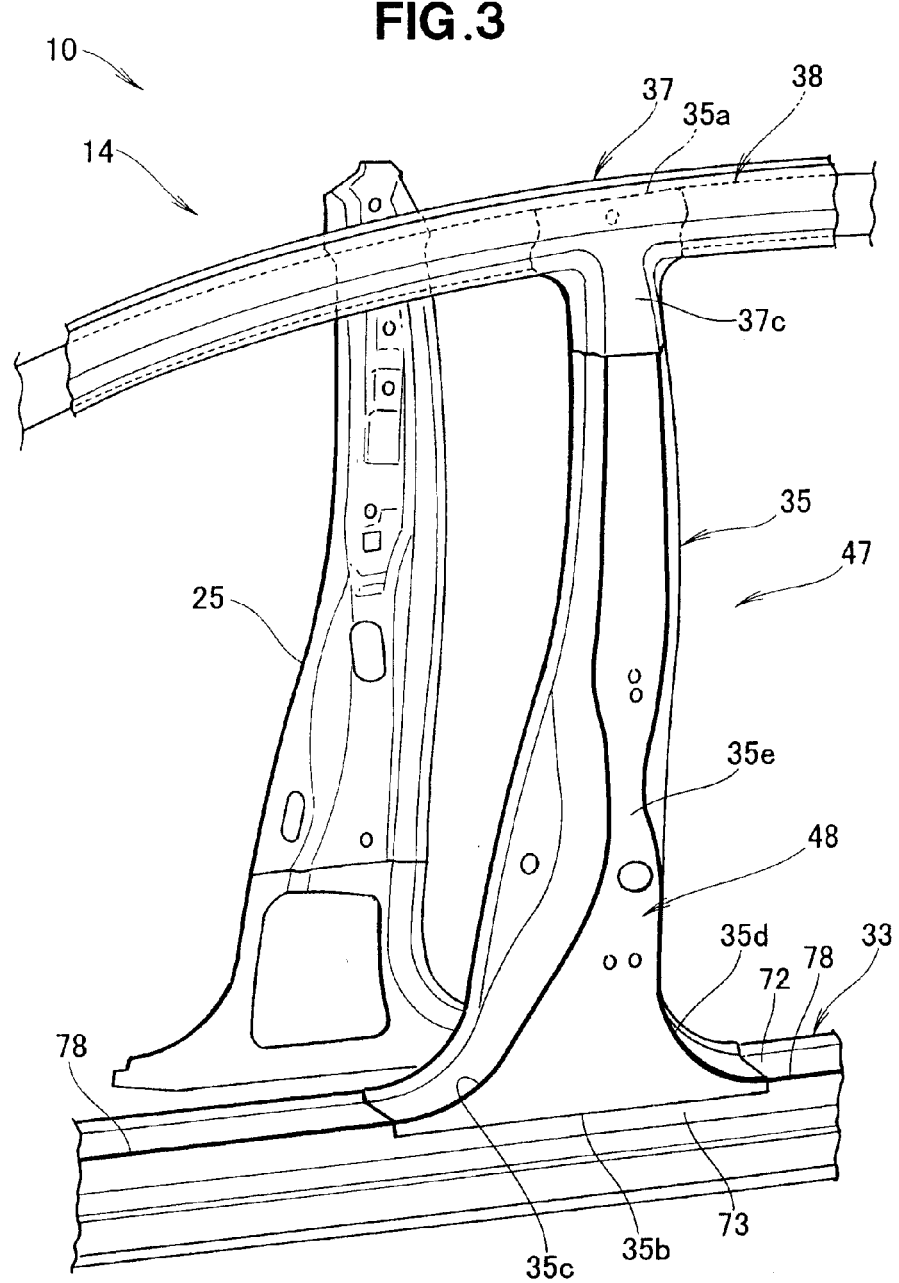
FIG. 3 is a perspective view of a center pillar of the vehicle side body structure shown in FIG. 1.

As shown in FIGS. 3 and 6, the roof rail stiffener 38 is fixedly joined at its front portion 38a to the upper end 31a of the outer lower front pillar section 31 and at its rear portion (more specifically, longitudinally-middle region of the rear portion) 38b to the upper end portion 35a of the center pillar section 35.

A center pillar 47 comprises the inner center pillar section 25 and the center pillar section 35 of the outer side panel unit 14.

The center pillar section 35 is fixedly joined at its upper end portion 35a to the outer surface 38c of the stiffener 38 provided within the roof rail section 37 and at its lower end portion 35b to the side sill section 33. The center pillar section 35, the roof rail section 37, the outer lower front pillar section 31, the side sill section 33 and the rear pillar section 36 constitute front and rear door openings 44A and 44B (see FIG. 6). A door hinge surface 48 formed on the outer side surface (i.e., side surface in a vehicle with direction) 35e of the center pillar section 35 extends substantially seamlessly or continuously and flush with the outer side surface 73 (see FIG. 5A) of the side sill section 33.

An extension portion 37c, projecting toward the center pillar section 35, of the roof rail section 37 is disposed over the outer surface of the upper end portion 35a of the center pillar section 35. In other words, the upper end portion of the center pillar section 35 is disposed inside the extension portion 37c of the roof rail section 37. Further, the upper end portion 35a of the center pillar section 35 is fixedly joined to the outer surface 38c of the roof stiffener 38. A sealer (not shown) is applied to an abutting surface between the center pillar section 35 and the extension portion 37c of the roof rail section 37.

In a lower end portion of the center pillar section 35, the center pillar section 35 is disposed on the side sill section 33 having a U sectional shape. Further, opposite ridgelines 35c and 35d of the center pillar section 35 having a U sectional shape are positioned to extend continuously with a ridgeline 78 of the side sill section 33.

As shown in FIG. 4, the center pillar section 35 is connected to a roof arch 84 extending transversely from an upper portion of the inner center pillar section 25 in the vehicle width direction. The roof arch 84 is covered with a roof panel 85 located above the roof arch 84. Note that a plurality of such transverse roof arches may be arranged side by side in the front-rear direction at generally the same height as the closed section 49.

The following describe plates (i.e., plate materials) used for forming the aforementioned components of the embodiment of the vehicle side body structure 10. The L-shaped lower frame section 41, comprising the side sill section 33 and outer lower front pillar section 31 integrally formed with each other, is formed of a cold rolled high-tensile steel plate, such as SPC980. "SPC" means a cold rolled steel plate, and "SPC980" means a cold rolled steel plate having a tensile strength exceeding 980 MPa. Further, in the following description, "SPC590" means a cold rolled steel plate having a tensile strength equal to or greater than 590 MPa, and "SPC270" means a cold rolled steel plate having a tensile strength equal to or greater than 270 MPa. Note that cold rolled steel plates having a tensile strength equal to or greater than 590 MPa are called "high-tensile steel plates" while cold rolled steel plates having a tensile strength equal to or greater than 270 MPa are called "ordinary-tensile steel plates" or "ordinary steel plates".

High-tensile steel plates have a high tensile strength as noted above. Use of high-tensile steel plates having a high tensile strength can enhance a strength of a product. Thus, using high-tensile steel plates can dispense with stiffeners heretofore used and achieve reduced thicknesses of plates, thereby achieving a reduced weight and reduced cost of a product. In an outer side panel unit within which reinforcements (stiffeners) can be provided, a resultant vehicle body would have an increased weight.

High-tensile steel plates have a lower ductility than ordinary-tensile steel plates. Therefore, high-tensile steel plates cannot be used for portions that have to be formed in small bending radii for an enhanced outer appearance, such as a boundary portion between a roof rail section and a door in an outer side panel unit. Thus, such high-tensile steel plates have heretofore been used mainly for forming reinforcements within an outer side panel unit.

As best seen from FIG. 3, the center pillar section 35 is formed by hot-stamping a cold rolled steel plate of a tensile strength in the range of 590-1,180 MPa. The "hot-stamping" is a method in which a steel plate is heated to a high temperature to be made easily deformable and then rapidly cooled upon shape-forming so as to attain a greater strength than before the shape-forming. Namely, by being rapidly cooled after the heating to the high temperature, the tensile strength of the steel plate can be increased up to about 1,500 MPa.

As cold rolled steel plates having a tensile strength in the range of 590-1,180 MPa, a tailored blank plate (i.e., prejoined steel plates different in thickness or in tensile strength) may be used. Thus, materials of high tensile strengths can be used only for portions requiring such high tensile strengths.

As an alternative, the center pillar section 35 may be formed by partly pressing cold rolled steel plates of tensile strengths of 590 MPa and 1,180 MPa and then joining together the thus-pressed cold rolled steel plates.

The inner center pillar section 25 too may be formed by hot-stamping a cold rolled steel plate of a high tensile strength, and the center pillar 47 may be composed of the center pillar section 35 and the thus-formed inner center pillar section 25.

By the center pillar section 35 being formed by hot-stamping a high-tensile cold rolled steel plate, it is possible to eliminate a need for a great press forming load, prevent occurrence of cracks etc. in the center pillar section 35 and thereby retain quality stability of the center pillar section 35.

Using a tailored blank plate (i.e., provided by joining together steel plates of different tensile strengths, such as in the range of 590-1,180 MPa) for forming the center pillar section 35, it is possible to use materials of high tensile strengths only for portions requiring such high tensile strengths.

In conjunction with the inner center pillar section 25, the center pillar section 35 forms a closed section 99 (FIG. 4) with no center pillar stiffener provided therein.

The roof rail stiffener 38 is formed of a cold rolled steel plate of a tensile strength exceeding 980 MPa, more specifically a zinc-plated steel plate (JAC980YL). "JAC980YL" is a zinc-plated high-tensile steel plate which has a tensile strength equal to or greater than 980 MPa.

The roof rail section 37 and the rear panel section 34 (composed of the rear pillar section 36 and rear fender panel 39) are formed integrally of an easily-press-formable cold rolled steel plate of a tensile strength exceeding 270 MPa, more specifically a zinc-plated steel plate (JAC270E). "JAC270E" is a zinc-plated ordinary-tensile steel plate which has a tensile strength equal to or greater than 270 MPa and has good workability with a low yield point of the steel plate.

As shown in FIGS. 5 to 7, the roof rail section 37, rear pillar section 36 and fender panel 39 of the outer side panel unit 14 are formed of a JAC270E plate, the outer lower front pillar section 31 and side sill section 33 of the outer side panel unit 14 are formed of a JAC980YL high-tensile plate, and the center pillar section 35 is formed of a high-tensile steel plate of a tensile strength of 1,000 MPa or over (hot-stamped plate). The center pillar section 35 is fixedly joined at its upper end portion 35a to the outer surface 38c of the stiffener 38 formed of a high-tensile steel plate (high-tensile plate) and at its lower end portion 35b to the side sill section 33 formed of a high-tensile steel plate (high-tensile plate), to thereby construct the outer side panel unit 14 of the vehicle side body structure 10.

Namely, the roof rail section 37 is formed of a JAC270E plate having good formability, so as to prevent portions of small bending radii (corner radii), such as corner portions 86 and 87 (FIG. 8B), of the roof rail section 37 from being cracked due to press forming.

The outer lower front pillar section 31 and side sill section 33 are formed integrally of a JAC980YL high-tensile steel plate (high-tensile plate). In this way, the instant embodiment can achieve an increased rigidity of the vehicle body and an increased strength against a lateral collision.

In order to achieve a reduced weight of the center pillar section 35, the center pillar section 35 is formed of a hot-stamped plate of 1,180 MPa or over, or 1,000 MPa or over. In this way, the center pillar section 35 can be easily formed to a desired shape and can have a high strength. The center pillar section 35 is fixedly joined at its upper end portion 35*a* to the outer surface 38*c* of the stiffener 38 formed of a high-tensile steel plate (high-tensile plate) and at its lower end portion 35*b* to the side sill section 33 formed of a high-tensile steel plate (high-tensile plate). In this way, a frame section 97 defining the front door opening 44A can have a high strength to thereby increase the rigidity of the vehicle body and increase the strength for bearing a lateral collision load.

The outer side panel unit 14 of the vehicle side body structure 10, as shown in FIG. 5A, is formed by fixedly joining, such as by welding, the center pillar section 35 to the lower frame section 41 and upper frame section 42, having fixedly joined thereto the stiffener 38, which are formed separately from the center pillar section 35.

The center pillar section 35 is welded to the roof rail section 37 and side sill section 33 with the upper end portion 35*a* of the center pillar section 35 welded to the inner surface of the roof rail section 37 and with the lower end portion 35*b* welded to the outer surface 72 of the lower frame section 41.

FIG. 5B is an enlarged view of a section encircled at "a" in FIG. 5A. The extension portion 37*c* of the outer roof rail section 37 formed of an ordinary-tensile steel plate is lapped over the upper end portion 35*a* of the center pillar section 35 formed of a high-tensile steel plate (see FIG. 6), and thus, the high-tensile steel plate can be fixedly joined to the stiffener 38 disposed inside the high-strength roof rail section 37 (see FIG. 8).

FIG. 5C is an enlarged view of a section encircled at "b" in FIG. 5A. In the lower end portion of the center pillar section 35, the center pillar section 35 is placed on the high-strength side sill section 33, and thus, the side sill section 33 need not have an opening in its outer surface 72. Such an arrangement can eliminate a cause of breakage of the side sill section 33 and thus allows the side sill section 33 to operate effectively against frontal and lateral collisions.

As seen from FIG. 6, the outer side panel unit 14 comprises: the upper frame section 42 constructed by press forming an ordinary-tensile steel plate into the integral rear pillar section 36 and fender panel 39; the lower frame section 41 constructed by press forming a high-tensile (980 MPa) steel plate into the integral outer lower front pillar section 31 and side sill section 33; and the center pillar section 35 stamp-formed separately from the upper and lower frame sections 42 and 41 and fixedly joined to the upper and lower frame sections 42 and 41. Further, the stiffener 38 formed of a high-tensile plate is fixedly joined inside the roof rail section 37, so that the high-strength frame section 97 is formed around the front door opening 44A.

The center pillar section 35 is fixedly joined at its upper end portion 35*a* to the stiffener 38, formed of a high-tensile steel plate and disposed inside the roof rail section 37, as indicated by arrow a1, and fixed at its lower end portion 35*b* to the side sill section 33, formed of a high-tensile steel plate, as indicated by arrow a2. The stiffener 38 formed of a high-tensile steel plate and the outer lower front pillar section 31 formed of a high-tensile steel plate are fixedly joined to each other as indicated by arrow a3. In this manner, the frame section 97 (composed of the stiffener 38, lower front pillar 17, side sill 16 and center pillar 47) defining the front door opening 44A can be constructed as a high-strength frame. As a result, the instant embodiment can increase the rigidity of the vehicle body and increase the strength for bearing a lateral collision load.

As shown in FIGS. 7A and 7B, when the roof rail section 37 and rear panel section 34 (composed of the rear pillar section 36 and fender panel 39 as shown in FIG. 6) integrally formed of a cold rolled steel plate of a tensile strength exceeding 270 MPa (hereinafter also referred to as "270 plate") and the side sill section 33 and outer lower front pillar section 31 integrally formed of a cold rolled steel plate of a tensile strength exceeding 980 MPa (hereinafter also referred to as "980 plate") are to be fixedly joined to each other, the 980 plate is inserted inside the 270 plate as indicated by arrows c1 and c2. In this manner, the 980 plate can be formed integrally so as to extend to a necessary portion irrespective of a divided position of the 270 plate.

Figure 8A:
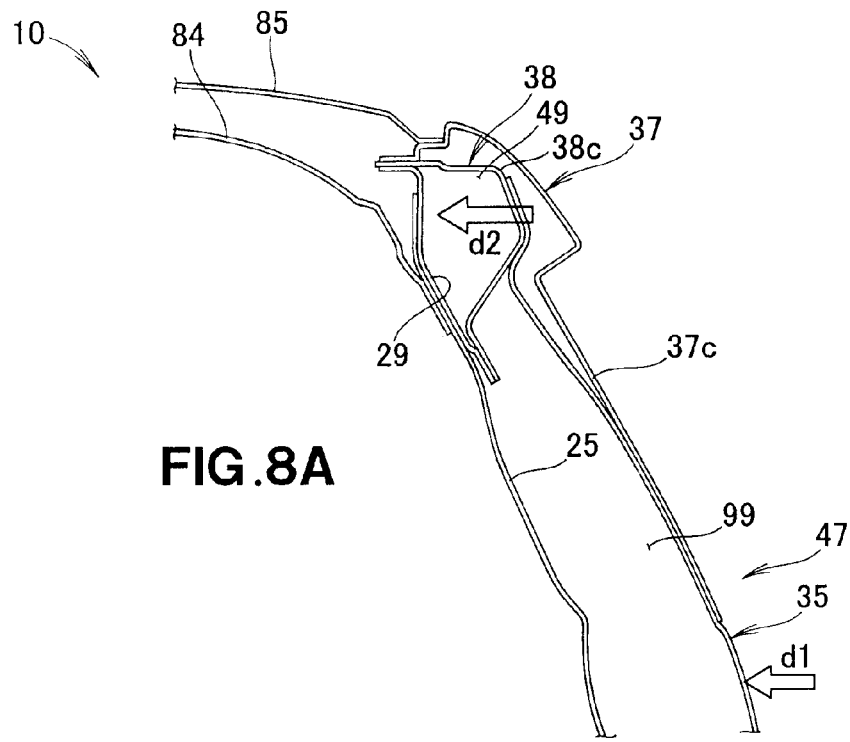
FIGS. 8A and 8B are views explanatory of how a collision load is transmitted in the vehicle side body structure shown in FIG. 1.

A lateral collision load acts on the center pillar section 35 as indicated by arrow d1 in FIG. 8A. In the vehicle side body structure 10, where the center pillar section 35 is fixedly joined at its upper end portion 35*a* directly to the stiffener 38 of the roof rail section 37, a load input to the center pillar section (outer center pillar) 35 at the time of a lateral collision can be directed to be input to the stiffener 38 as indicated by arrow d2.

Figure 8B:
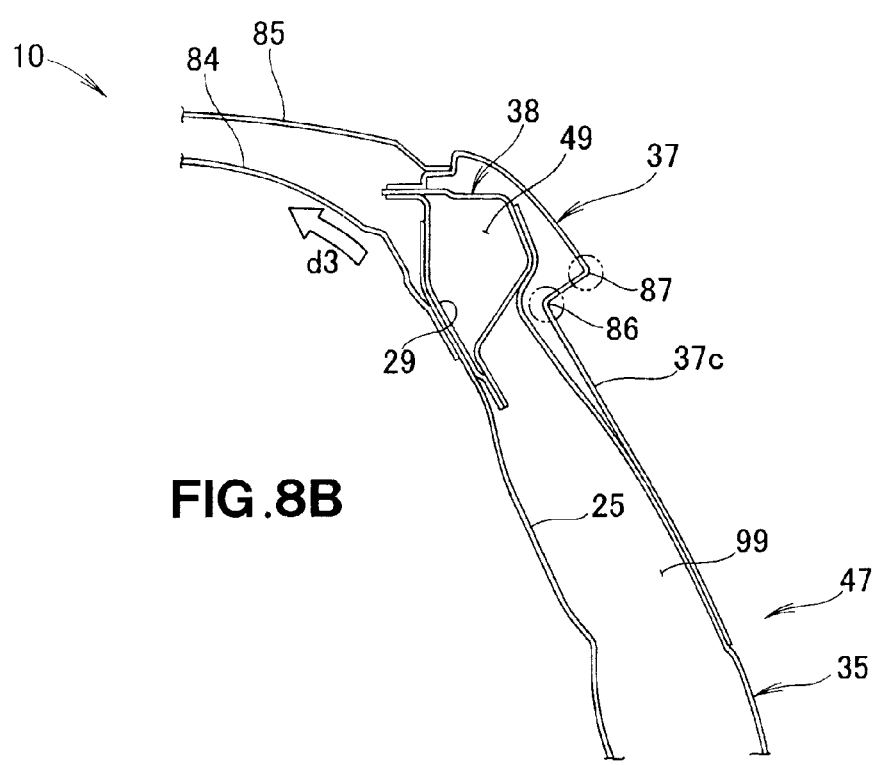

As shown in FIG. 8B, the load input to the stiffener (roof stiffener) 38 can be dispersed, via the inner roof rail 29 and inner center pillar section 25, to the roof arch 84 as indicated by arrow d3.

Because the roof rail section 37 is formed of an ordinary-tensile steel plate (270 plate), the corner portions 86 and 87 can be press formed into desired small bending radii (corner radii). In this manner, the instant embodiment can reduce a gap between the roof rail section 37 and each of the front door 98A and rear door 98B (see FIG. 4), thereby achieving an improved outer appearance.

As shown in FIGS. 1 to 7, the instant embodiment of the vehicle side body structure 10 includes the outer side panel unit 14 that covers a side of the vehicle body 11 from outside. The outer side panel unit 14 includes: the roof rail section 37 that covers at least the inner roof rail 29 and the slanting section 28 of the inner front pillar section 27 of the vehicle body 11; the outer lower front pillar section 31 that covers the inner lower front pillar section 22 of the vehicle body 11; the side sill section 33 that covers the inner side sill section 21 of the vehicle body 11; and the center pillar section 35 that covers the inner center pillar section 25 of the vehicle body 11.

Because the center pillar section 35 is formed by hot-stamping a cold rolled steel plate of a tensile strength of 590-1,180 MPa, and because the stiffener 38 formed of a cold rolled steel plate of a tensile strength exceeding 980 MPa is disposed within the roof rail section 37, the roof rail section 37 of the outer side panel unit 14 can be formed, for example, of an easily-press-formable cold rolled steel plate of a tensile strength of about 270 MPa (i.e., 270 plate). Thus, the instant embodiment allows the roof rail section 37 to be formed into desired small bending radii (corner radii) and thus reduce a gap between the roof rail section 37 and each of the front door 98A and rear door 98B, thereby achieving an improved outer appearance of the vehicle.

Because the center pillar section 35 is formed by hot-stamping a cold rolled steel plate of a tensile strength of 590-1,180 MPa, and the stiffener 38 formed of a cold rolled steel plate of a tensile strength exceeding 980 MPa is provided inside the roof rail section 37, the instant embodiment can eliminate a need for a great press forming load, prevent occurrence of cracks etc. in the center pillar section 35 and thereby retain quality stability of the center pillar section 35.

Further, the center pillar section 35 formed by hot-stamping a cold rolled steel plate of a tensile strength of 590-1,180 MPa is fixedly joined at its upper end portion 35a to the outer surface 38c of the stiffener 38 formed of a cold rolled steel plate of a tensile strength exceeding 980 MP and fixed at its lower end portion 35b to the side sill section 33, and the front door opening 44A is defined by the center pillar section 35, roof rail section 37, outer lower front pillar section 31 and side sill section 33. Thus, the instant embodiment of the vehicle side body structure 10 can increase the strength for bearing a lateral collision load and disperse the lateral collision load to the transverse roof arch 84 via the stiffener 38 located at an upper position of the vehicle side body structure 10.

In other words, in the vehicle side body structure 10 including the outer side panel unit 14 that covers a side of the vehicle body 11 from outside, the center pillar section 35 is formed of a high-tensile steel plate separately from the upper and lower frame sections 42 and 41 and fixedly joined to the outer side panel frame section 96, to thereby provide the outer side panel unit 14 having the front and rear door openings 44A and 44B. The roof rail section 37 constituting part of the outer side panel frame section 96 is formed of an ordinary-tensile steel plate, the stiffener (reinforcing member) 38 is disposed inside and along the inner surface of the roof rail section 37, and the center pillar section 35 is fixedly joined at its upper end portion 35a to the outer surface 38c of the stiffener 38 and fixed at its lower end portion 35b to the side sill section 33.

Namely, because the roof rail section 37 can be formed of an easily-press-formable, ordinary-tensile cold rolled steel plate and can be formed into desired small bending radii (corner radii) and thus reduce a gap between the roof rail section 37 and each of the front door 98A and rear door 98B, the instant embodiment can achieve an improved outer appearance. Because the center pillar section 35 of the outer side panel unit 14 is formed of a high-tensile steel plate, it can have an increased strength for bearing a lateral collision load and disperse the lateral collision load to the roof arch 84, disposed crosswise of the vehicle body, via the stiffener 38 located at an upper position of the vehicle side body structure 10.

In the outer side panel unit 14, the roof rail section 37 and the rear panel section 34 constitute the upper frame section 42 of an ordinary-tensile steel plate, the outer lower front pillar section 31 and the side sill section 33 constitute the lower frame section 41 of a high-tensile steel plate, and the upper frame section 42 and the lower frame section 41 are joined to each other at their respective opposite ends to provide the outer side panel frame section 96.

Namely, because a lateral collision load to the center pillar 47 is borne by the outer side panel frame section 96 constructed, as a high-strength frame, of the high-tensile steel plate of the lower frame section 41 and the reinforcing member 38 of the upper frame section 42, the vehicle side body structure 10 can have a high strength and rigidity.

Further, because the reinforcing member (stiffener) 38, which is formed of a high-tensile steel plate, is fixedly joined at its front portion 38a to the upper end 31a of the outer lower front pillar section 31 formed of a high-tensile steel plate and at its rear portion 38b to the upper end portion 35a of the center pillar section 35 formed of a high-tensile steel plate, a high-strength frame can be constructed around the front door 98A (front door opening 44A). In this way, human occupants of the vehicle can be effectively protected from a lateral collision.

Furthermore, because the reinforcing member (stiffener) 38 forms the closed section 49 in conjunction with the inner roof rail 29 covered with the roof rail section 37, it is possible to even further increase the strength of the roof rail section 37 and high-strength frame (outer side panel frame section) 96.

Furthermore, because the cross or transverse roof arch 84, disposed transversely of the vehicle body, and the center pillar section 35 are fixedly joined to each other with the closed section 49 sandwiched between, a lateral collision load having acted on the center pillar section 35 can be dispersed to the cross roof arch 84 via the closed section 49.

Whereas the vehicle side body structure 10 of the present invention has been described in relation to the case where the center pillar section 35 is formed by hot-stamping a cold rolled steel plate having a tensile strength in the range of 590-1,180 MPa, the present invention is not so limited, and various other sections too may be formed by hot-stamping cold rolled steel plates having tensile strengths in the range of 590 to 1,180 MPa.

Further, whereas the vehicle side body structure 10 of the present invention has been described in relation to the case where the stiffener 38 of the roof rail section 37 is formed of a cold rolled steel plate of tensile strength exceeding 980 MPa, the present invention is not so limited, and various other sections too may be formed of cold rolled steel plates of tensile strengths exceeding 980 MPa.

Furthermore, whereas, in the vehicle side body structure 10 of the present invention, the center pillar section 35 is fixedly joined to the roof arch 84, extending from an upper portion of the inner center pillar section 25 in the vehicle width direction each other, with the closed section 49 sandwiched between, a plurality of such transverse roof arches may be arranged side by side in the front-rear direction and fixedly joined to the closed section 49. In this case, a lateral collision can be effectively dispersed to the plurality of roof arches via the closed section 49.

Furthermore, the reinforcing member 38 may be in the form of a hollow member, such as a pipe, rather than being limited to the one that forms a closed section in conjunction with the inner roof rail.

The following describe differences in construction, advantageous benefit, etc. between a comparative conventional example of a vehicle side body structure 230 and the embodiment of the vehicle side body structure 10.

FIG. 9A shows the comparative conventional example of the vehicle side body structure 230, in which a center pillar 231 comprises: an inner center pillar section 232 disposed inwardly of the vehicle body; a center pillar section 234 of an outer side panel unit 233 that covers the inner center pillar section 232; a center pillar stiffener 235 disposed between the inner center pillar section 232 and the center pillar section 234; and an inner side sill section 236 to which the lower end portion of the inner center pillar section 232 is fixedly joined. In the comparative conventional example 230, the center pillar stiffener 235 has a multiplicity of holes 239 to permit flows therethrough an electrodeposition (ED) coating material for promoting adhesion of the ED coating material.

FIG. 9B shows the embodiment of the vehicle side body structure 10, in which the center pillar 47 comprises the inner center pillar section 25 disposed inwardly of the vehicle body 11, and the high-strength center pillar section 35 of the outer side panel unit 14 that covers the inner center pillar section 25. Because the center pillar section 35 functions also as a stiffener (reinforcing member), electrodeposition (ED) coating is not required here, and thus, there is no need to form a multiplicity of holes for permitting flows of an ED coating material. With no hole formed in the center pillar section 35, the instant embodiment can achieve enhanced vehicle body performance, such as an enhanced anti-lateral-collision performance, as well as reduced processing cost.

In the comparative conventional example of the vehicle side body structure 230, as shown in FIG. 10A, the center pillar section 234 is not formed of a high-strength plate, and thus, the center pillar stiffener (reinforcement) 235 and the inner side sill section 236 are formed of high-strength plate materials, and these high-strength members 235 and 236 are assembled to define ridgelines 237 and 238.

On the other hand, in the embodiment of the vehicle side body structure 10, as shown in FIG. 10B, the center pillar section 35 is formed of a high-strength plate, and thus, the high-strength center pillar section 35 and the high-strength side sill section 33 are assembled in such a manner their respective ridgelines 35c and 35d and 78 form continuous ridgelines as indicated by arrows e1 and e2. In this way, the embodiment of the vehicle side body structure 10 can achieve an enhanced strength and rigidity in regions thereof near an object colliding against the vehicle and thereby achieve an enhanced lateral collision performance.

Further, because the center pillar section 35 is formed by hot stamping, the ridgelines 35c and 35d of the center pillar section 35 can be reduced in dimension, so that surfaces which door seals 88 (see FIG. 4) abut against near the ridgelines 35c and 35d can be positioned closer to the door seals 88.

Further, in the embodiment of the vehicle side body structure 10, where the door hinge surface 48 of the center pillar section 35 is formed to lie continuously with the outer side surface 73 (see FIG. 5A) of the side sill section 33, it is possible to minimize left-right deformation of the door hinge surface 48 and outer side surface 73 relative to each other in the vehicle width direction and thereby contribute to enhancement of the vehicle body rigidity.

Furthermore, in the embodiment of the vehicle side body structure 10, the front door opening 44A is defined by the center pillar section 35, roof rail section 37, outer lower front pillar section 31 and side sill section 33, the center pillar section 35 is formed by hot stamping a cold rolled steel plate of a tensile strength of 590-1,180 MPa, and the ridgelines 35c and 35d of the center pillar section 35, spreading out toward the side sill section 33, extend continuously with the front-rear ridgeline 78 of the side sill section 33. Thus, a lateral collision load input to the door hinge surface 48 of the center pillar section 35 can be effectively dispersed to the high-strength and high-rigidity side sill 16 that is composed of the inner side sill section 21 and the side sill section 33.

Furthermore, because the center pillar section 35 is formed by hot stamping a cold rolled steel plate of a tensile strength of 590-1,180 MPa, there is no need to form a multiplicity of holes for promoting adhesion of an ED coating material as formed in the comparative conventional example, and thus, the instant embodiment can achieve reduced processing cost.

Further, because the center pillar section 35 is formed of a high-tensile steel plate and the ridgelines 35c and 35d of the center pillar section 35 extend continuously with the front-rear ridgeline 78 of the side sill section 33, a lateral collision load input to the door hinge surface 48 of the center pillar section 35 can be dispersed to the side sell section 33 formed of a high-tensile steel plate. Such arrangements can eliminate needs for a center pillar stiffener like the aforementioned center pillar stiffener 235 (see FIG. 9A) and for a multiplicity of ED-coating-material discharging holes as formed in the aforementioned center pillar stiffener 235.

Furthermore, because the center pillar section 35 is formed by hot stamping, the ridgelines 35c and 35d of the center pillar section 35 can be formed in desired small bending (or corner) radii, and thus, the instant embodiment can achieve an enhanced rigidity, strength and collision load transmission characteristics.

Furthermore, because the door hinge surface 48 of the center pillar section 35 lies continuously with the outer side surface 73 of the side sill section 33, it is possible to minimize left-right deformation of the door hinge surface 48 and thereby contribute to enhancement of the vehicle body rigidity.

Furthermore, because the center pillar section 35 of the outer side panel unit 14 is formed of a high-tensile steel plate and because the center pillar section 35 defines the closed section 99, having no center pillar stiffener provided therein, in conjunction with the inner center pillar section 25, the instant embodiment can dispense with a center pillar stiffener as required in the comparative conventional example, thereby eliminating a need for a multiplicity of holes for promoting adhesion of an ED coating material as formed in the comparative conventional example. As a result, the instant embodiment can achieve an enhanced vehicle body performance, collision performance and reduced processing cost.

Furthermore, the roof rail section 37 and the rear panel section 34 constitute the upper frame section 42 of an ordinary-tensile steel plate, the outer lower front pillar section 31 and the side sill section 33 constitute the lower frame section 41 of a high-tensile steel plate, and the upper frame section 42 and the lower frame section 41 are joined to each other at their respective opposite ends to provide the outer side panel frame section 96, and the center pillar section 35 is provided between the upper frame section 42 and the lower frame section 41. Using a high-tensile steel plate for forming portions that require a high strength as above can dispense with, among others, inner reinforcing members. As a result, it is possible to provide, at low cost, a vehicle body which has an increased rigidity and strength and a reduced weight.

Furthermore, in the embodiment of the vehicle side body structure 10, the reinforcing member (stiffener) 38, which is formed of a high-tensile steel plate and is fixedly joined at its front portion 38a to the upper end 31a of the outer lower front pillar section 31 formed of a high-tensile steel plate, is provided inside the roof rail section 37, and the center pillar section 35 is fixedly joined at its upper end portion 35a to the outer surface 38c of the rear portion 38b of the stiffener 38 and fixed at its lower end portion 35b to the outer surface 72 of the side sill section 33. Such arrangements can effectively disperse a lateral collision load also via the upper end portion of the center pillar section 35.

Figure 11:
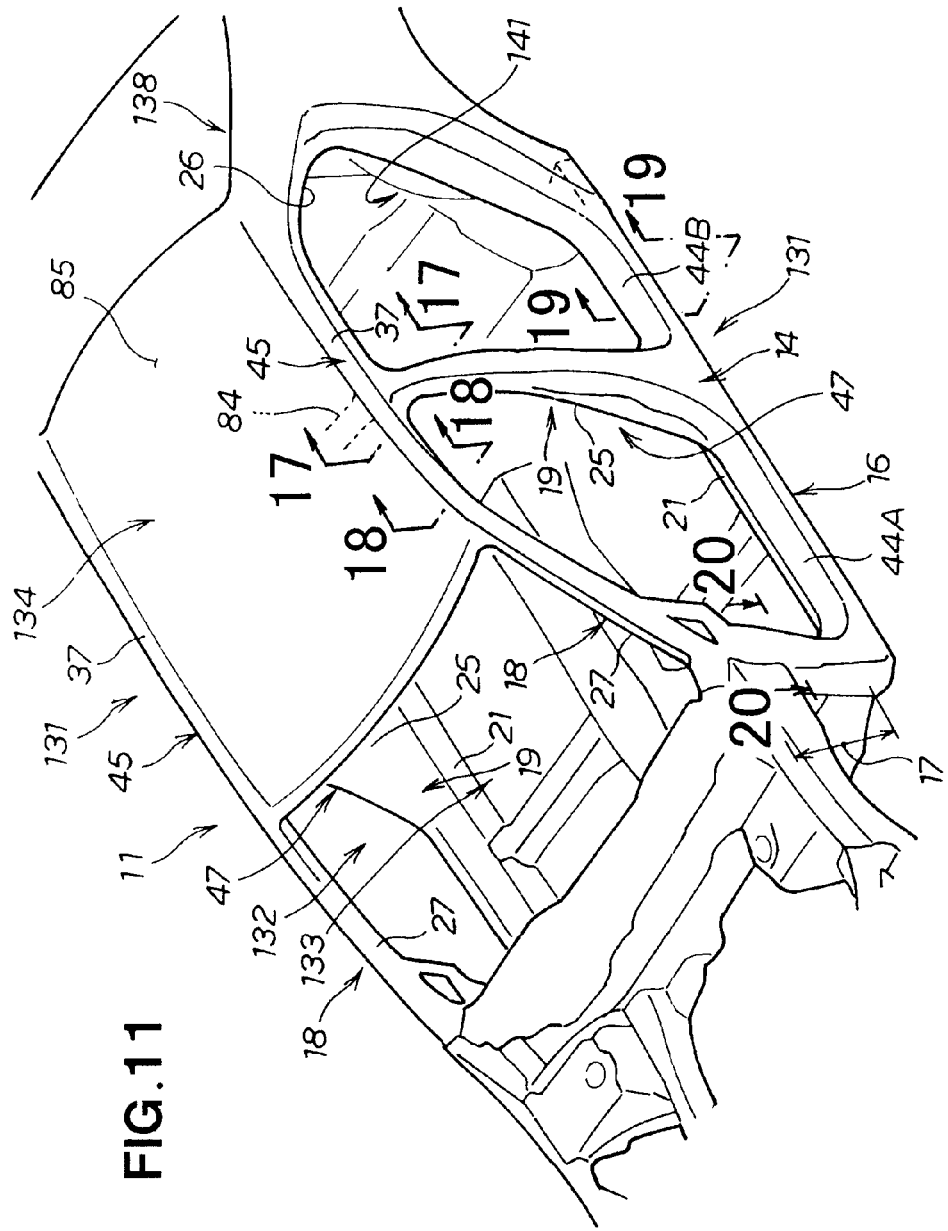
FIG. 11 is a perspective view of the vehicle body employing the embodiment of the vehicle side body structure.

FIG. 11 is a perspective view of the vehicle body employing the embodiment of the vehicle side body structure. The vehicle body 11 includes left and right side bodies 131 constituting left and right side walls of passenger compartment 132, a floor (i.e., under body) 133 of the passenger compartment 132, and a roof 134.

In the embodiment of the vehicle side body structure, the under body 33 and the roof 134 are fixed to the left and side bodies 131. Each of the side bodies 131 includes the side sill 16, the front pillar 18, the roof rail 45, the center pillar 47, a rear pillar 138, and a wheel house 141.

Figure 12:
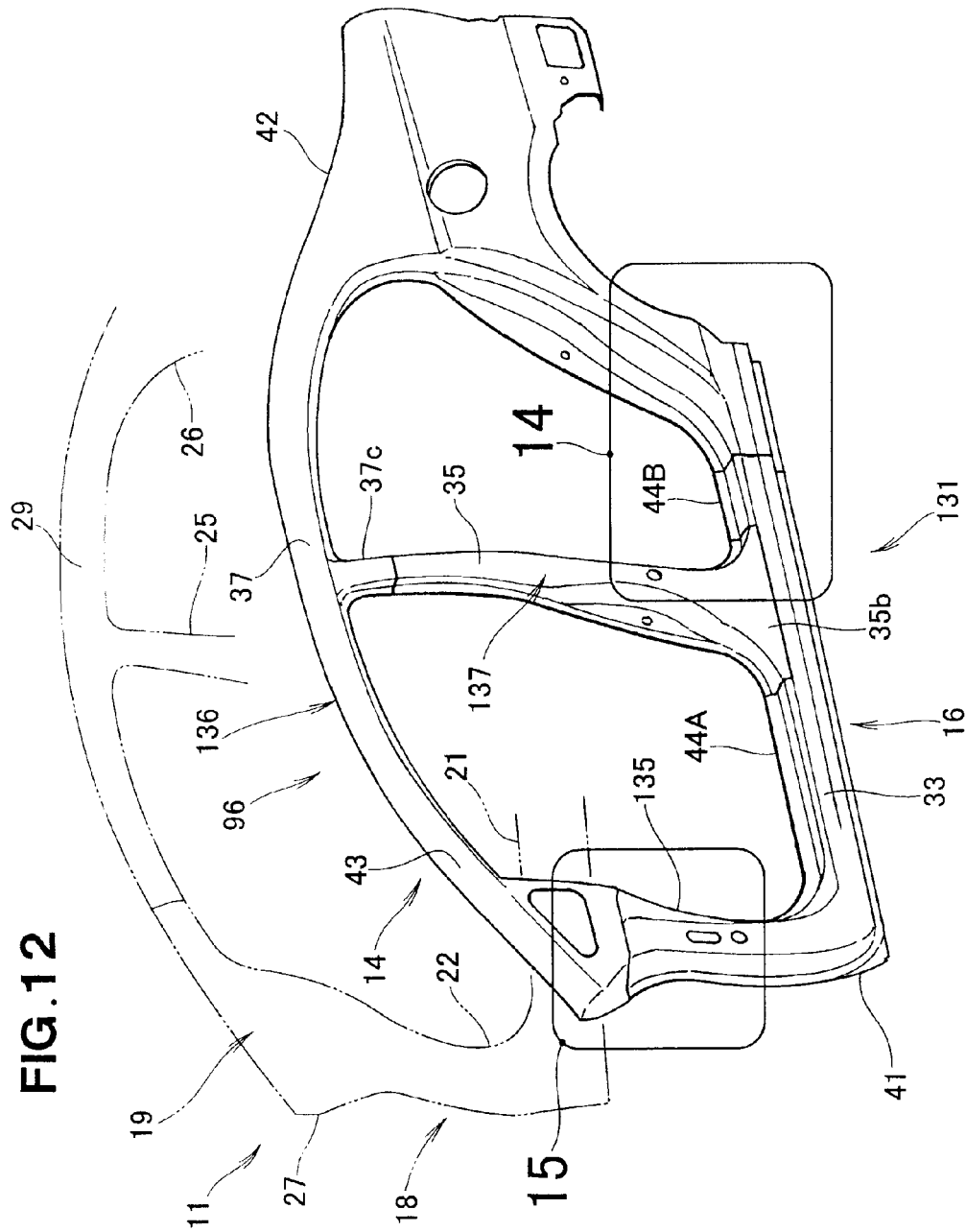
FIG. 12 is a perspective view of the outer side panel unit in the embodiment of the vehicle side body structure.
Figure 16:
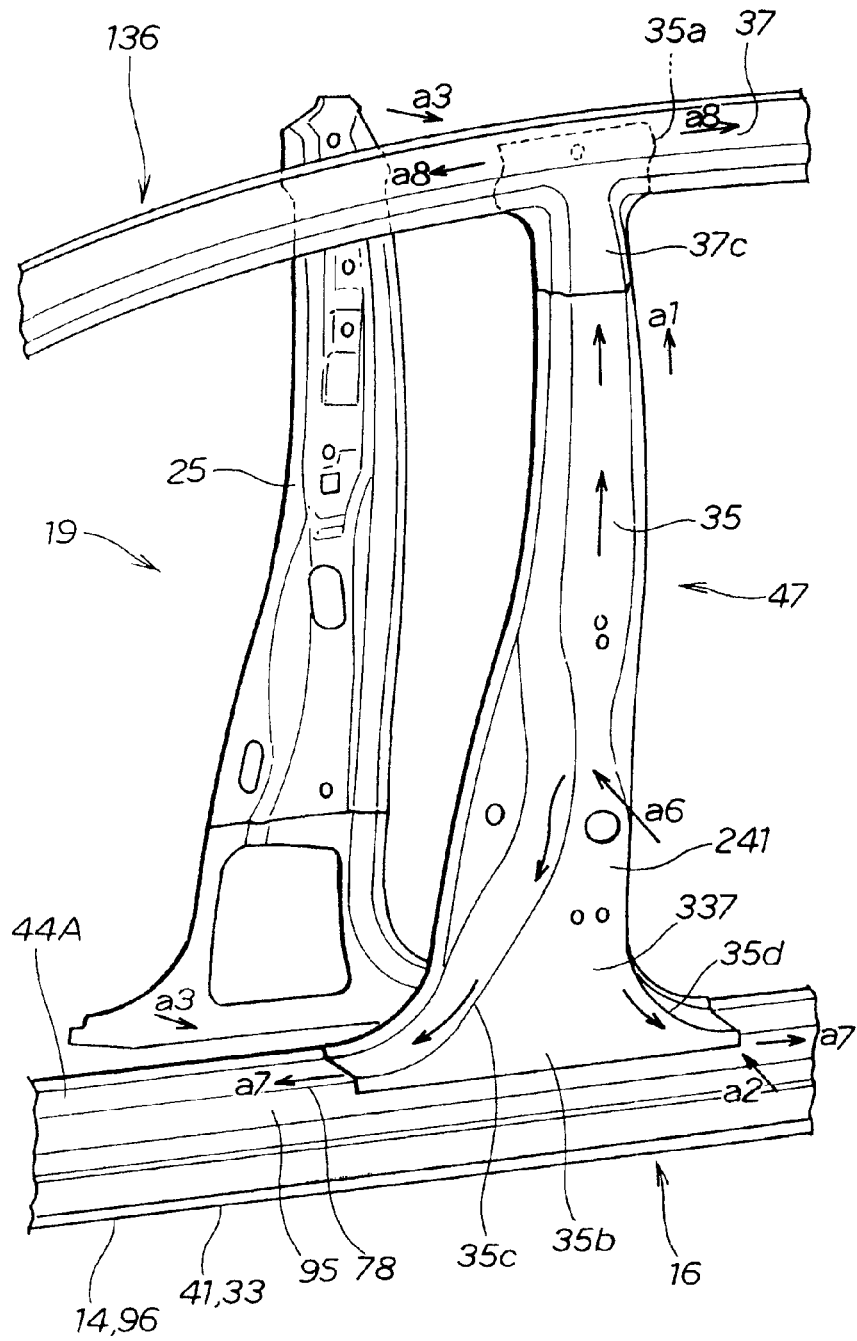
FIG. 16 is an exploded perspective view of the center pillar in the embodiment of the vehicle side body structure.
Figure 20:
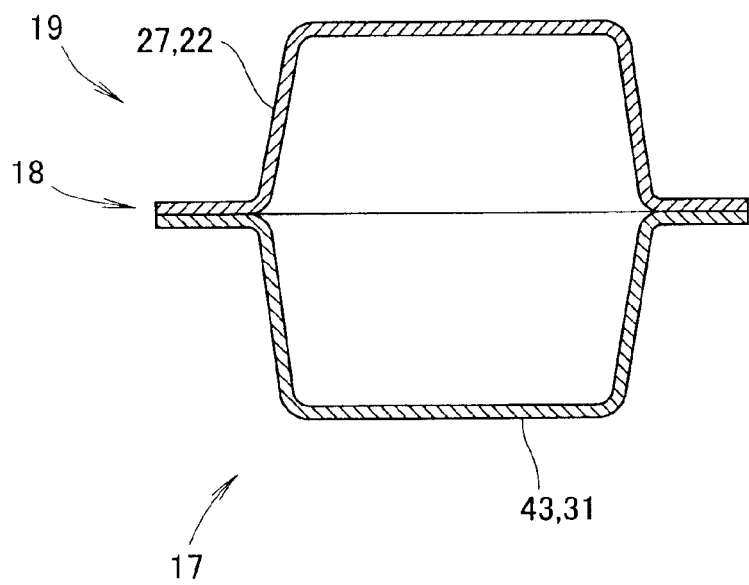
FIG. 20 is a sectional view taken along line 20-20 of FIG. 11.

As shown in FIGS. 12 and 20, the front pillar 18 comprises an outer front pillar section 43 and the inner front pillar section 27. As shown in FIG. 16, the center pillar 37 comprises the outer center pillar section 35 and the inner center pillar section 25.

Figure 17:
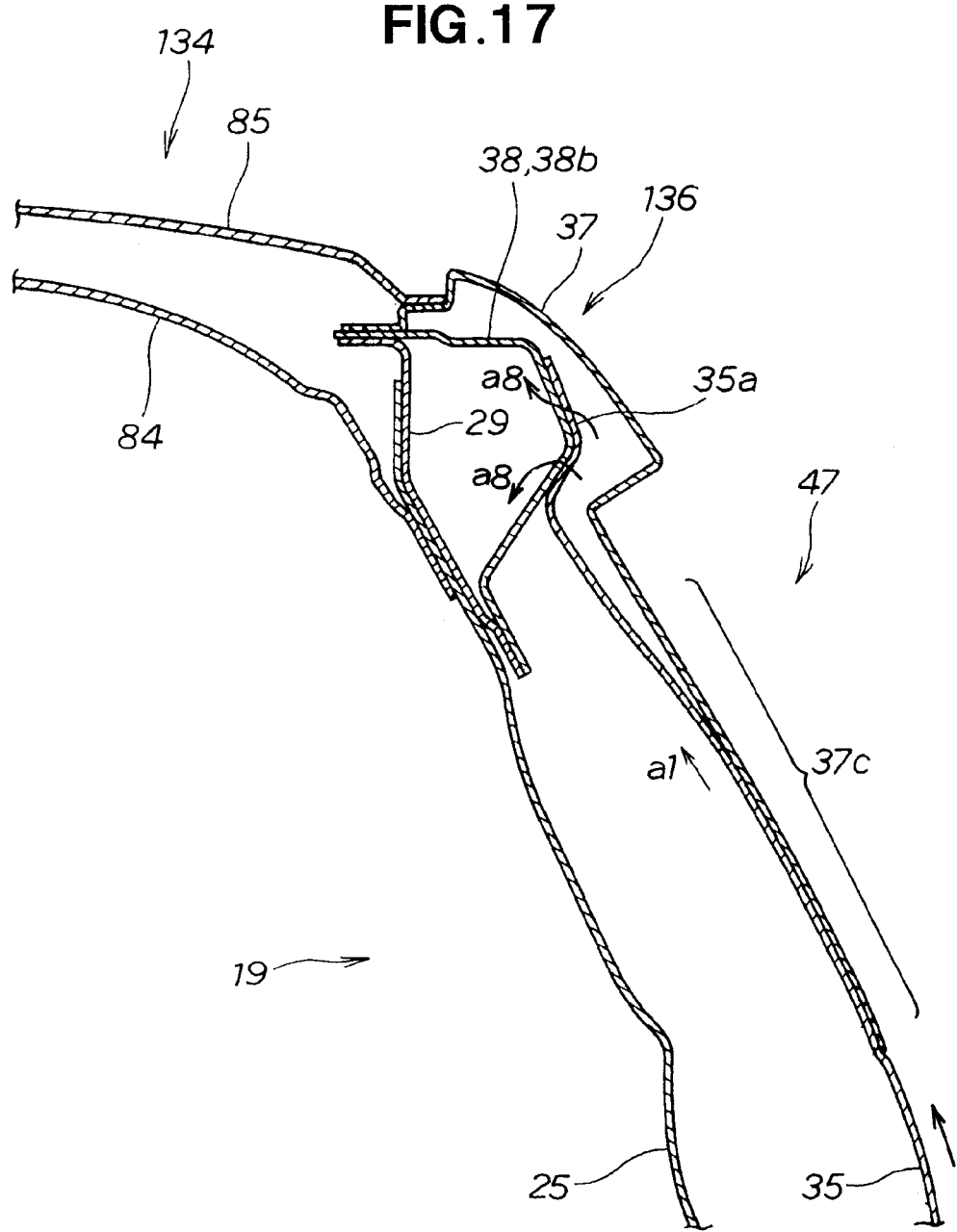
FIG. 17 is a sectional view taken along line 17-17 of FIG. 11.
Figure 18:
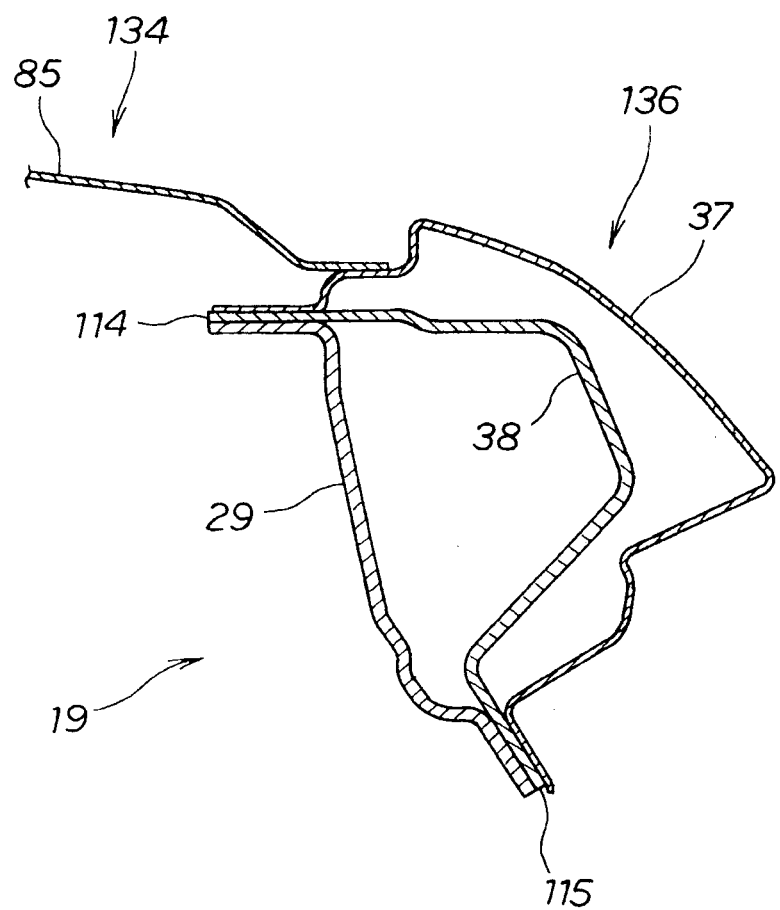
FIG. 18 is a sectional view taken along line 18-18 of FIG. 11.

As shown in FIG. 17, the roof 134 includes the center roof arch 84 and the roof panel 85. As shown in FIGS. 17 and 18, the roof rail 45 comprises the outer roof rail section 37, the inner roof rail section 29, and the high-strength reinforcing member 38. The outer roof rail section 37 has the extension portion 37c formed in a longitudinally-middle region thereof.

Figure 19:
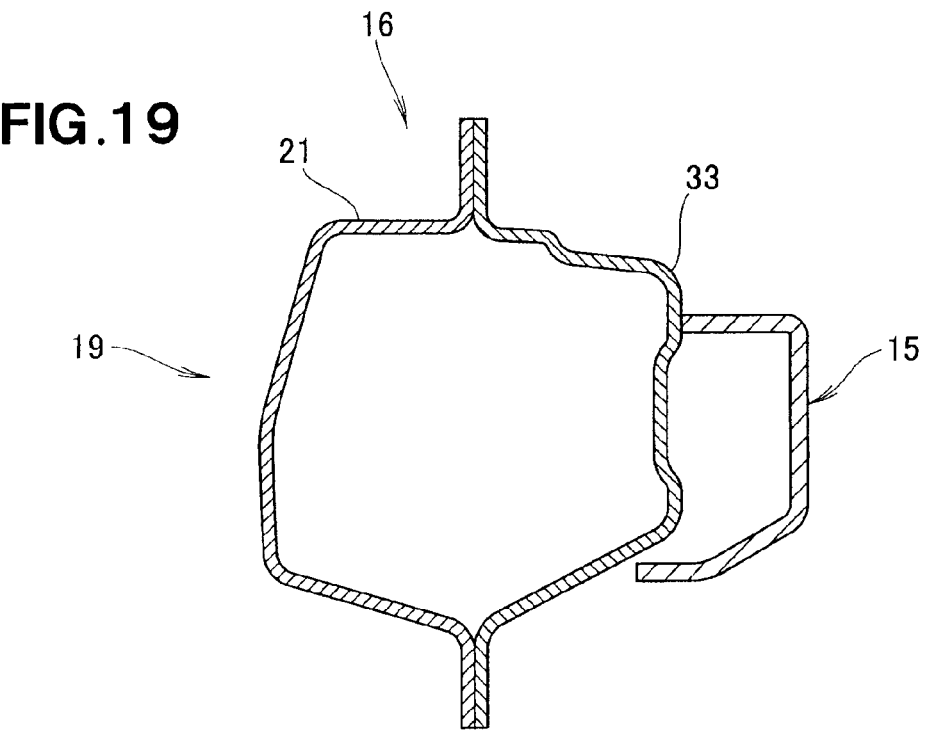
FIG. 19 is a sectional view taken along line 19-19 of FIG. 11.

As shown in FIG. 19, the side sill 16 comprises the outer side sill section 33, the inner side sill section 21, and the side sill garnish 15 attached to the outer side sill section 33.

With reference to FIGS. 11 to 24, a description will be given about more details of the embodiment of the vehicle side body structure 10 of the present invention.

To each of the side bodies 131, constituting the side walls of the passenger compartment 132, are fixed the roof 134 constituting the roof of the passenger compartment 132, and the underbody 133 constituting the floor of the passenger compartment 132.

In the outer side panel unit 14 (see FIG. 12) of each of the side bodies 131, the front and rear door openings 44A and 44B are defined by the outer center pillar section 35 being fixedly joined to the outer side panel frame section 96 (see FIG. 13) that comprises the upper frame section 42 and the lower frame section 41.

Figure 13:
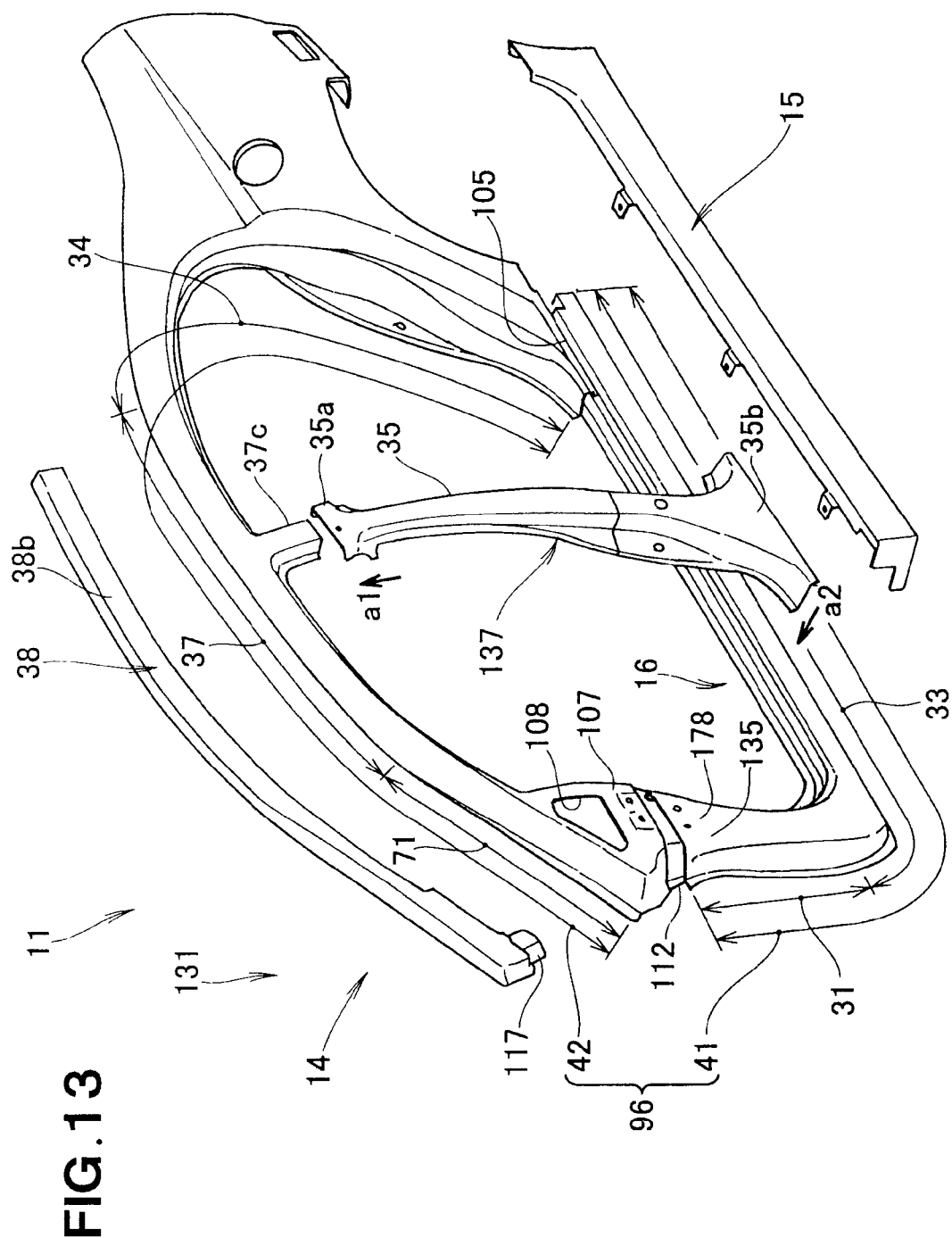
FIG. 13 is an exploded perspective view of the outer side panel unit in the embodiment of the vehicle side body structure.

As shown in FIG. 13, the upper frame section 42 is integrally formed of an ordinary (ordinary-tensile) steel plate (which is a cold rolled steel plate having a tensile strength of at least 270 MPa) all the way from a slanting upper portion 71 of the outer front pillar section 43 (i.e., outer upper front pillar section 71), through the outer roof rail section 37, to the rear panel section 34.

As also shown in FIG. 13, the lower frame section 41 is formed of a high-tensile steel plate (which is a cold rolled steel plate having a tensile strength of at least 980 MPa) all the way from the outer lower front pillar section 31, fixedly joined to the outer upper front pillar section 71, to the outer side sill section 33 of the side sill 16.

The high-strength reinforcing member 38, having a tensile strength of at least 980 MPa and integrally extending down to the upper end 178 (see also FIG. 15) of the outer lower front pillar section 31, is provided inside the outer roof rail section 37.

The outer center pillar section 35 is plastically formed of a high-tensile steel plate having a tensile strength of at least 590 MPa to 1,180 MPa, and it is fixedly joined at its upper end portion 35a to the high-strength reinforcing member 38 inside the outer roof rail section 37 and at its lower end portion 35b to the outer side sill section 33 as shown in FIG. 17. The inner side sill section 21 (see FIGS. 19 and 23) is fixedly joined to the outer side sill section 33 to thereby define a closed sectional shape, in conjunction with the latter, extending in the front-rear direction.

Figure 14:
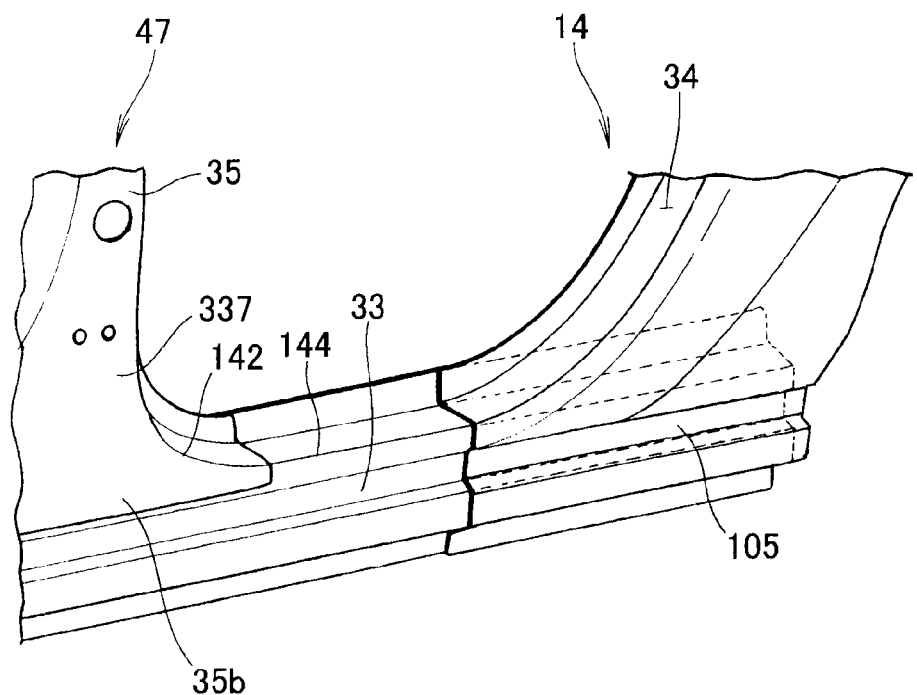
FIG. 14 is a view showing in enlarged scale a section indicated at 14 in FIG. 12.

Further, in the side body 131, as shown in FIGS. 13 and 14, a side sill joint portion 105 provided on the rear panel section 34 of the outer side panel unit 14 is placed on the outer side sill section 33.

The following describe in greater detail a preferred embodiment of the outer center pillar section 35. The outer center pillar section 35 is plastically formed by hot stamping a high-tensile steel plate having a tensile strength of at least 1,180 MPa. More specifically, the outer center pillar section 35 is formed of a pressed material cut out from a single steel plate plastically formed by hot stamping in advance. This hot stamping achieves a tensile strength of about 1,500 MPa by rapidly cooling a steel plate heated to a high temperature.

Alternatively, the outer center pillar section 35 may be formed using a tailored steel plate. Namely, the outer center pillar section 35 is plastically formed of a tailored steel plate having a tensile strength at least in the range of 590 MPa to 1,180 MPa. More specifically, the outer center pillar section 35 is formed using a pressed material cut out from a tailored steel plate formed by butt-joining two different types of steel plates, such as a steel plate having a tensile string of at least 590 MPa and a steel plate having a tensile string of at least 1,180 MPa. In the case where a tailored steel plate is used like this, it is desirable that a portion of the outer center pillar section 35, lying a longitudinally middle of the pillar section 35 to the upper end portion 35a, be formed of the steel plate having a tensile string of at least 1,180 MPa.

Now, with reference to FIGS. 13 to 17, a description will be given about how the outer side panel unit 14 is assembled.

Figure 15:
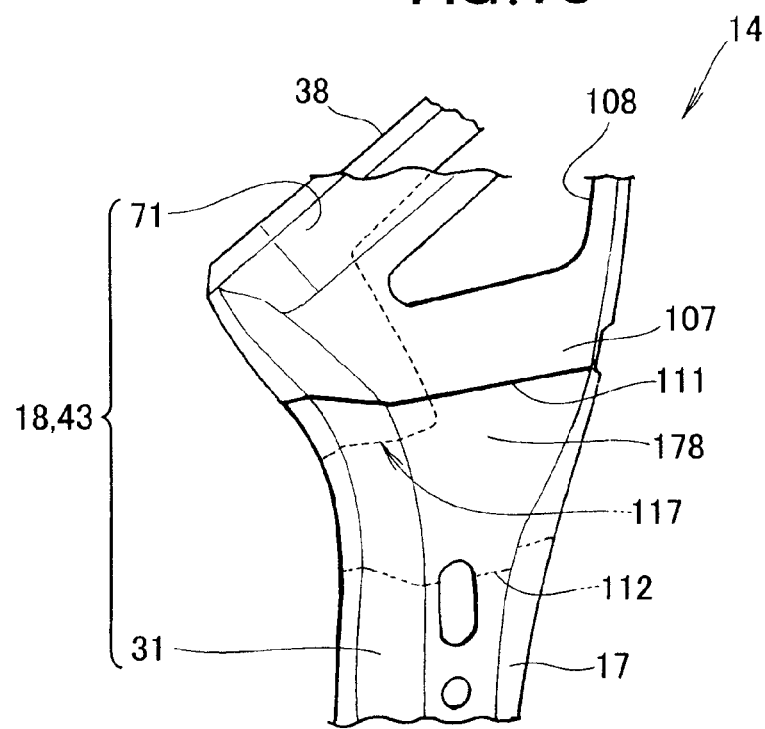
FIG. 15 is a view showing in enlarged scale a section indicated at 15 in FIG. 12.

First, a front end portion (i.e., outer lower front pillar section 31) of the lower frame section 41 is superposed on a front end portion (i.e., outer upper front pillar section 71) of the upper frame section 42, as shown in FIG. 15. Substantially simultaneously, a rear end portion (i.e., outer side sill section 33) of the lower frame section 41 is superposed on a rear end portion (i.e., rear panel section 34), as shown in FIG. 14.

Then, spot welding is performed on the thus-superposed front and rear end portions to thereby fixedly join together the lower frame section 41 and upper frame section 42. Alternatively, a combination of spot welding and riveting or only riveting may be performed on the superposed front and rear end portions.

As shown in FIGS. 13 and 15, the outer upper front pillar section 71 has an upper joint portion 107. The upper joint portion 107 is formed in a U sectional shape, and it has a triangular shape as viewed from a side of the vehicle. Further, the upper joint portion 107 has a triangular opening 108 formed centrally therein. The upper joint portion 107 has a bottom edge portion 111 elongated in the front-rear direction, and a joint body portion 112 extending downward continuously from the bottom edge portion 111 is superposed on and fixedly joined to the outer lower front pillar section 31.

Then, the side sill joint portion 105 of the rear panel section 34 is fixedly joined to the outer side sill section 33. In the case where the upper frame section 42 (integrally comprising the outer upper front pillar section 71, outer roof rail section 37 and rear panel section 34) is formed of a steel plate having a tensile strength of at least 270 MPa, plastic forming workability can be enhanced with a low yield point of the steel plate.

The following briefly describe how the high-strength reinforcing member 38 is assembled to the roof rail 45, with reference to FIGS. 13, 17 and 18. The reinforcing member 38 is mounted inside the roof rail 45, as shown in FIG. 18. More specifically, inner and outer flanges 114 and 115 of the reinforcing member 38 are sandwiched between the outer roof rail section 37 and the inner roof rail section 29; thus, the inner and outer flanges 114 and 115 of the reinforcing member 38 are superposed on the outer roof rail section 37 and the inner roof rail section 29. Then, spot welding is performed on the thus-superposed portions so that the superposed portions are fixedly joined together, so that the reinforcing member 38 is fixedly joined to the outer roof rail section 37 and the inner roof rail section 29. Further, a front end portion 117 of the reinforcing member 38 is fixedly joined to the outer lower front pillar section 31, as shown in FIG. 15.

If the reinforcing member 38 is formed of a material having a tensile strength of at least 980 MPa, it can have an equal strength and rigidity to the lower frame section 41.

The following briefly describe how the outer center pillar section 35 is assembled to the outer side panel frame section 96, with reference to FIGS. 13 to 17. First, the upper end portion 35a of the outer center pillar section 35 is inserted into the outer roof rail section 37 of the outer side panel frame section 96 as indicated by arrow a1 in FIGS. 13 and 17, so that the upper end portion 35a is superposed on the extension portion 37c of the outer roof rail section 37. On the other hand, the lower end portion 35b of the outer center pillar section 35 is superposed on the outer side sill section 33 as indicated by arrow a2 in FIGS. 13 and 16.

Then, spot welding is performed on the thus-superposed end portions 35a and 35b to thereby fixedly join the ends 35a and 35b to the outer roof rail section 37 and outer side sill section 33. In this way, the outer center pillar section 35 can be assembled to the outer side panel frame section 96 with ease. Then, the inner center pillar section 25 is fixedly mounted to the outer center pillar section 35, as indicated by arrow a3 in FIG. 16.

The following paragraphs describe in greater detail of the construction of the embodiment of the vehicle side body structure, with reference to FIGS. 11 to 24.

As shown in FIG. 24, the outer side panel unit 14 of each of the side bodies 131 constituting the side walls of the passenger compartment 132 comprises at least: the outer front pillar section 43 of the front pillar 18 (front frame) defining the front door opening 44A; the outer center pillar section 35 of the center pillar 37 (rear frame) defining the front door opening 44A; the outer roof rail section 37 of the roof rail 45 (upper frame) defining the front door opening 44A and extending in the front-rear direction of the vehicle; and the outer side sill section 33 of the side sill 16 (lower frame) defining the front door opening 44A.

The outer lower front pillar section 31 of the outer front pillar section 43 is formed of a high-tensile steel plate, and the outer center pillar section 35 is formed of a high-tensile steel plate.

Figure 21A:
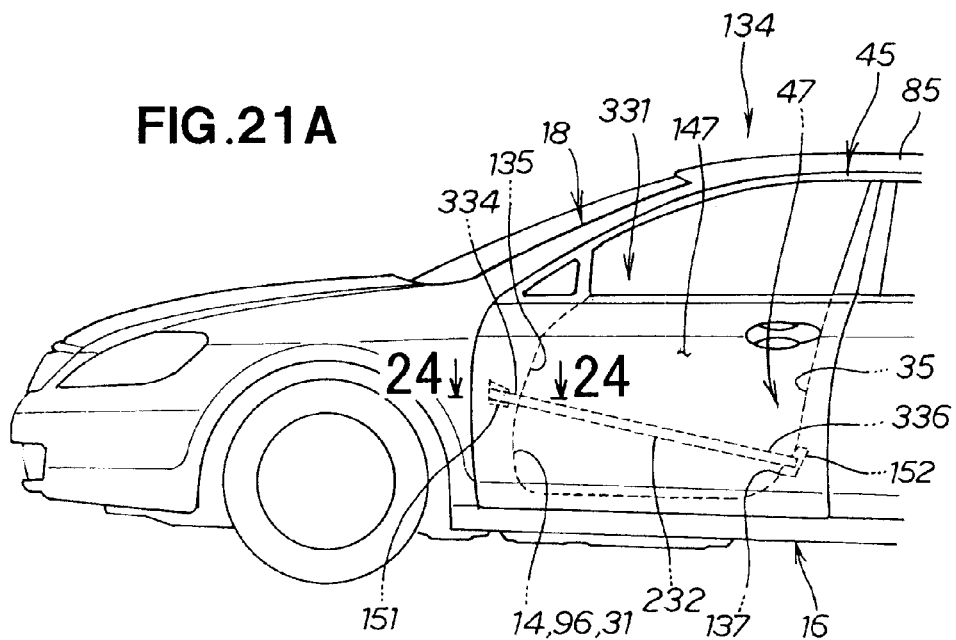
FIGS. 21A and 21B are side schematic and detailed views, respectively, of a front door in the embodiment of the vehicle side body structure.
Figure 21B:
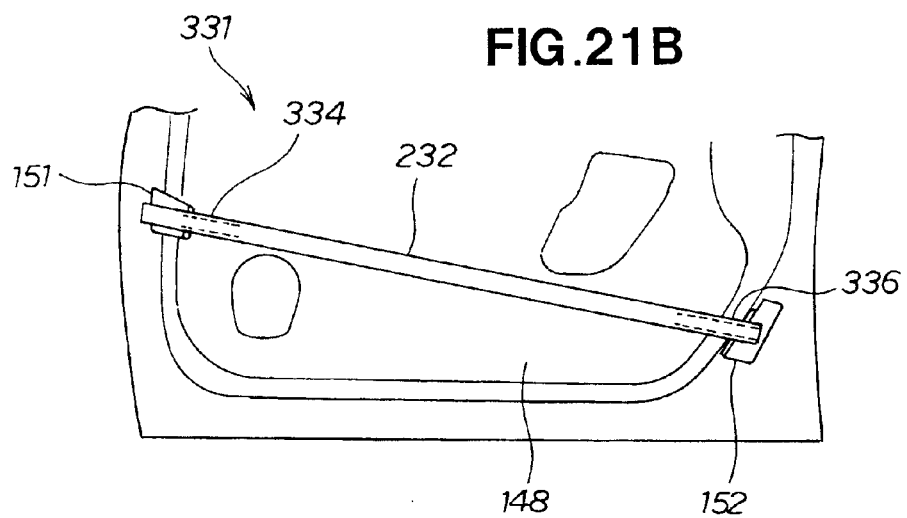
Figure 22:
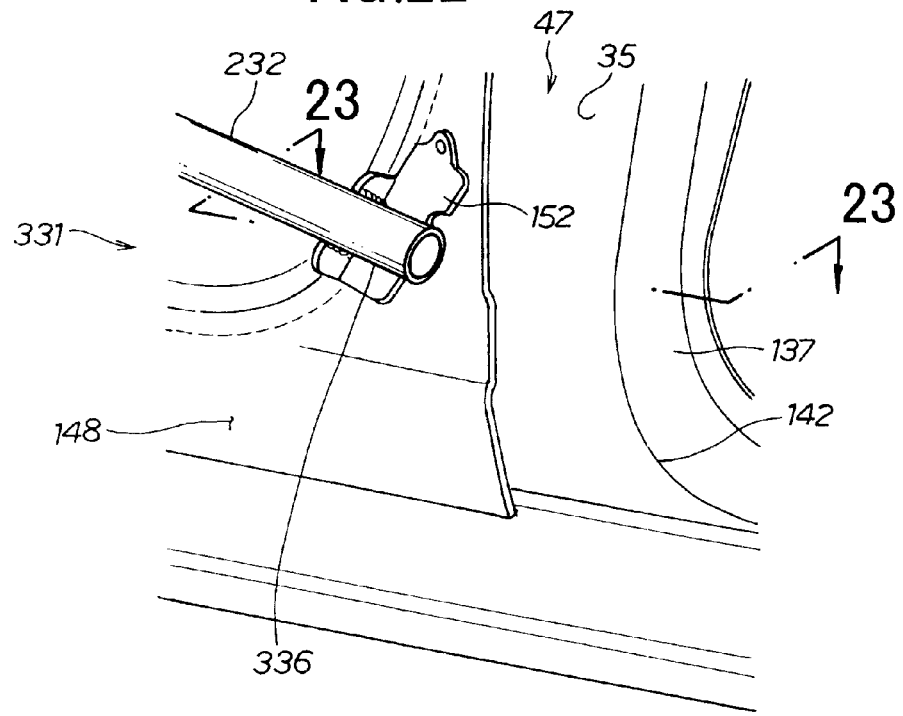
FIG. 22 is a perspective view showing relationship between the center pillar and the front door in the embodiment of the vehicle side body structure.

A door beam 332 disposed within a front door 331 provided in the front door opening 44A is lapped over the outer center pillar section 35 and outer lower front pillar section 31 as viewed from a side of the vehicle (see FIG. 21A). More specifically, the door beam 332 is disposed within the front door 331 in such an oblique orientation that its front end portion 334 is opposed to an upper increased-width portion 135 (FIGS. 12 and 13) of the outer lower front pillar section 31 and its rear end portion 336 is opposed to a lower increased-width portion 137 of the outer center pillar section 35.

The outer center pillar section 35 has a U or channel sectional shape, and ridgeline portions 142 defining corners of a bottom portion 241 of the outer center pillar section 35 continuously with a ridgeline portion 144 of the outer side sill section 33, as shown in FIG. 16.

Figure 23:
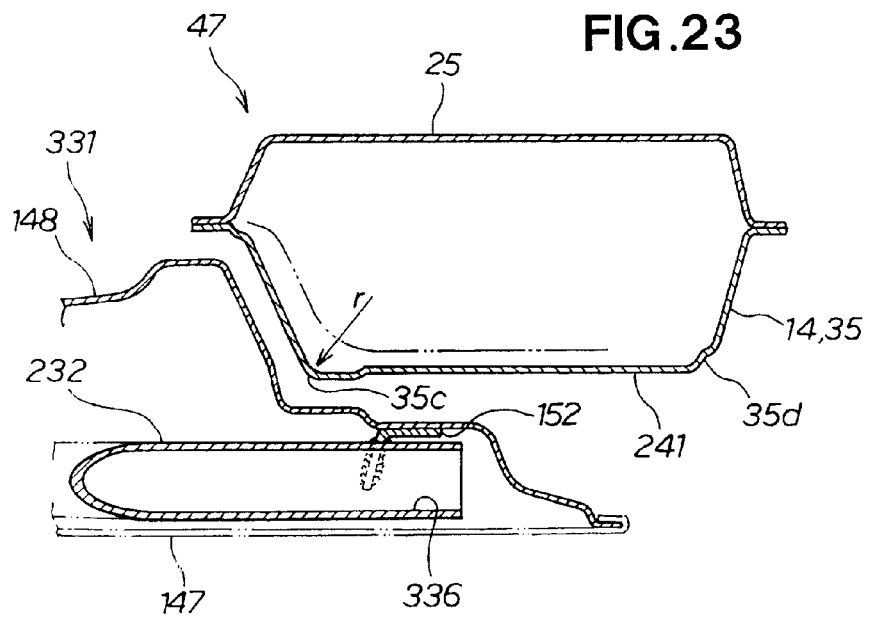
FIG. 23 is a sectional view taken along line 23-23 of FIG. 22.

As shown in FIGS. 23 and 24, the front door 331 includes an outer door panel 147, an inner door panel 148 and the door beam 232. A first bracket 151 is fixed to a front end portion 334 of the door beam 232 near the front end of the inner door panel 148, and a second bracket 152 is fixed to a portion of the door beam 232 near the rear end of the inner door panel 148.

Further, as shown in FIG. 21A, the first bracket 151 is lapped over the upper increased-width portion 135 of the outer lower front pillar section 31 (see also FIG. 24), and the second bracket 152 is lapped over the lower increased-width portion 137 of the outer center pillar section 35 (see also FIG. 23).

The following describe behavior of the embodiment of the vehicle side body structure 10 of the present invention. Once a load is input to the front door 331 due to a lateral collision or the like of the vehicle, the door beam 232 is pushed toward the interior of the passenger compartment 132, so that it abuts against the upper increased-width portion 135 of the outer lower front pillar section 31 and against the lower increased-width portion 137 of the outer center pillar section 35 to thereby transmits the load thereto.

Because the outer center pillar section 35 has corners (defined by the ridgeline portions 142) each formed in a smaller bending radius r than a corner in the conventional counterpart (indicated by two-dot-dash line in FIG. 23). Thus, the front door 331 is located closer to the outer center pillar section 35, and the outer center pillar section 35 overlaps the door beam 232 by a greater amount; that is, an overlap width between door beam 232 and the outer center pillar section 35 is greater than that in the conventional counterpart. Therefore, at the time of a lateral collision of the vehicle, the center pillar 37 (outer center pillar section 35) can sufficiently bear a collision impact (load).

Once a load is input to the outer center pillar section 35 due to a lateral collision as indicated by arrow a6 in FIG. 16, the load is transmitted continuously, via the ridgeline portions 142, to the ridgeline portion 144 of the outer side sill section 33 as indicated by arrow a7 in FIG. 16. In this manner, the impact (load) produced due to the lateral collision or the like can be dispersed continuously to the side sill 16. At that time, the upper end portion 35a of the outer center pillar section 35 transmits the collision impact (load) to the reinforcing member 38 inside the outer roof rail section 37 as indicated by arrow a8 in FIG. 17. Thus, the impact (load) produced due to the lateral collision can be dispersed continuously to the roof rail 45 as indicated by arrow a8.

The basic principles of the present invention are well suited for application to passenger vehicles equipped with a vehicle side body structure including an outer side panel unit that covers a side of the vehicle from outside.

The invention claimed is:

1. A vehicle side body structure including an outer side panel unit which covers a side of a vehicle body from outside, the outer side panel unit comprising:

an outer side panel frame section including a roof rail section, an extension portion, and a rear panel section, the roof rail section, the extension portion, and the rear panel section formed as a single piece from an ordinary steel plate having a tensile strength exceeding 270 MPa, the roof rail section and the rear panel section together constituting an upper frame section, said outer side panel frame section also including a lower front pillar section and a side sill section formed as a single piece from a high-tensile strength steel plate having a tensile strength equal to or greater than 590 MPa, the lower front pillar section and the side sill section together constituting an L-shaped lower frame section, the upper frame section and the L-shaped lower frame section being fixedly joined to each other at respective opposite ends thereof to thereby constitute the outer side panel frame section;

a center pillar section formed of a high-tensile strength steel plate having a tensile strength of 590 MPa to 1,180 MPa, the center pillar section being formed separately from the outer side panel frame section, the center pillar section being fixedly joined to the outer side panel frame section in such a manner that front and rear door openings are defined in the outer side panel unit;

the roof rail section having corner portions facing toward the front and rear door openings;

the extension portion of the roof rail section lapped over an upper end portion of the center pillar section from outside under the corner portions; and a reinforcing member disposed inside and along the roof rail section, the center pillar section being fixedly joined at the upper end portion thereof to an outer surface of a rear portion of the reinforcing member within the roof rail section and at a lower end portion thereof to the side sill section, the reinforcing member having a front portion fixedly joined to an upper end of the lower front pillar section.

2. The vehicle side body structure of claim 1, wherein the center pillar section has a U sectional shape, and opposite ridgelines of the cross-sectionally U-shaped center pillar section extend continuously with a ridgeline of the side sill section.

3. The vehicle side body structure of claim 1, further comprising: a front door provided within the front door opening and a door beam disposed within the front door, wherein the door beam overlaps both the center pillar section and the lower front pillar section as viewed from a side of the vehicle.

4. The vehicle side body structure of claim 3, wherein the lower front pillar section and the center pillar section have respective increased-width portions, and the door beam is disposed in the front door in such an oblique orientation that a front end portion thereof is opposed to the increased-width portion of the lower front pillar section and a rear end portion thereof is opposed to the increased-width portion of the center pillar section.

5. The vehicle side body structure of claim 4, wherein the center pillar section has a channel sectional shape, and ridgeline portions, defining corners of a bottom portion, of the center pillar section extend continuously with a ridgeline portion of the side sill section constituting the lower frame of the front door opening.

6. A vehicle side body structure including an outer side panel unit which covers a side of a vehicle body from outside, the outer side panel unit comprising:
   an outer side panel frame section including a roof rail section, an extension portion, and a rear panel section constructed as a single piece by press forming a cold rolled ordinary steel plate having a tensile strength exceeding 270 MPa, the roof rail section and the rear panel section together constituting an upper frame section, said outer side panel frame also including a lower front pillar section and a side sill section constructed as a single piece by press forming a cold rolled high-tensile strength steel plate having a tensile strength equal to or greater than 590 MPa, the lower front pillar section and the side sill section together constituting an L-shaped lower frame section, the frame section and the L-shaped lower frame sections being fixedly joined to each other at respective opposite ends thereof to thereby constitute the outer side panel frame section;
   a center pillar section formed of a hot-stamped high-tensile strength steel plate having a tensile strength of 590 MPa to 1,180 MPa, the center pillar section being formed separately from the outer side panel frame section, the center pillar section being fixedly joined to the outer side panel frame section in such a manner that front and rear door openings are defined in the outer side panel unit; and
   a reinforcing member disposed inside and along the roof rail section,
   the center pillar section being fixedly joined at an upper end portion thereof to an outer surface of a rear portion of the reinforcing member within the roof rail section and at a lower end portion thereof to the side sill section,
   the reinforcing member having a front portion fixedly joined to an upper end of the lower front pillar section.

* * * * *